(12) United States Patent
Shaik et al.

(10) Patent No.: US 12,441,631 B1
(45) Date of Patent: *Oct. 14, 2025

(54) DESALINATION METHOD

(71) Applicant: PRINCE MOHAMMAD BIN FAHD UNIVERSITY, Dhahran (SA)

(72) Inventors: Feroz Shaik, Andhra Pradesh (IN); Faizan Ahmed, Hyderabad Telangana (IN)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 19/191,480

(22) Filed: Apr. 28, 2025

Related U.S. Application Data

(62) Division of application No. 18/975,601, filed on Dec. 10, 2024.

(51) Int. Cl.
*C02F 1/06* (2023.01)
*B01D 1/00* (2006.01)
(Continued)

(52) U.S. Cl.
CPC .............. *C02F 1/06* (2013.01); *B01D 1/0035* (2013.01); *B01D 1/0082* (2013.01); *B01D 3/008* (2013.01);
(Continued)

(58) Field of Classification Search
CPC .... B01D 1/0035; B01D 1/0082; B01D 3/008; B01D 3/06; B01D 3/42; B01D 5/0006;
(Continued)

(56) References Cited

U.S. PATENT DOCUMENTS 9,278,315 B2 * 3/2016 Davis .................. B01D 1/0035
9,289,696 B2 * 3/2016 Al-Garni ................ F24T 10/10
(Continued)

FOREIGN PATENT DOCUMENTS

AU        200181421 A1    5/2002
CN        105731711 A     7/2016
(Continued)

OTHER PUBLICATIONS

Espacenet Machine Translation of WO 2021047682 Obtained Mar. 29, 2025. (Year: 2025).*

(Continued)

*Primary Examiner* — Jonathan Miller
(74) *Attorney, Agent, or Firm* — Oblon, McClelland, Maier & Neustadt, L.L.P.

(57) ABSTRACT

A desalination system and method for controlling the desalination system include thin-filmed photocatalyst coated glass tubes which perform a photocatalytic cleaning reaction to remove contaminants. A first flow control valve directs the contaminant-free feed water either to a feed water heater for pre-heating or to a geothermal energy-based heat exchanger. A second flow control valve directs a first portion of the pre-heated contaminant-free feed water to a thermal energy storage tank and a second portion to a flash chamber for steam generation. A condenser connected to the flash chamber includes a nano-fluid cooling coil that condenses steam into potable water.

18 Claims, 9 Drawing Sheets

(51) Int. Cl.
| | |
|---|---|
| *B01D 3/00* | (2006.01) |
| *B01D 3/06* | (2006.01) |
| *B01D 3/42* | (2006.01) |
| *B01D 5/00* | (2006.01) |
| *B01J 21/06* | (2006.01) |
| *B01J 23/72* | (2006.01) |
| *B01J 35/39* | (2024.01) |
| *C02F 1/00* | (2023.01) |
| *C02F 1/14* | (2023.01) |
| *C02F 1/32* | (2023.01) |
| *C02F 1/72* | (2023.01) |
| *F24S 20/20* | (2018.01) |
| *F24T 10/10* | (2018.01) |
| *H02S 10/20* | (2014.01) |
| *C02F 101/20* | (2006.01) |
| *C02F 101/30* | (2006.01) |

(52) U.S. Cl.
CPC ............... *B01D 3/06* (2013.01); *B01D 3/42* (2013.01); *B01D 5/0006* (2013.01); *B01D 5/006* (2013.01); *B01D 5/0084* (2013.01); *B01D 5/009* (2013.01); *B01J 21/063* (2013.01); *B01J 23/72* (2013.01); *B01J 35/39* (2024.01); *C02F 1/008* (2013.01); *C02F 1/14* (2013.01); *C02F 1/32* (2013.01); *C02F 1/725* (2013.01); *F24S 20/20* (2018.05); *F24T 10/10* (2018.05); *H02S 10/20* (2014.12); *C02F 2101/20* (2013.01); *C02F 2101/30* (2013.01); *C02F 2201/005* (2013.01); *C02F 2201/009* (2013.01); *C02F 2201/326* (2013.01); *C02F 2209/006* (2013.01); *C02F 2305/10* (2013.01)

(58) Field of Classification Search
CPC ...... B01D 5/006; B01D 5/0084; B01D 5/009; C02F 1/008; C02F 1/06; C02F 1/14; C02F 1/32; C02F 1/725
See application file for complete search history.

(56) References Cited

U.S. PATENT DOCUMENTS

| | | | | |
|---|---|---|---|---|
| 9,834,455 | B2 * | 12/2017 | Frolov | B01D 3/007 |
| 10,183,233 | B1 * | 1/2019 | Haidar | B01D 3/008 |
| 10,207,935 | B2 * | 2/2019 | Beitelmal | B01D 1/0035 |
| 10,752,523 | B2 * | 8/2020 | Bower | C02F 1/447 |
| 10,829,913 | B1 * | 11/2020 | Ahmed | B01D 61/025 |
| 11,014,016 | B2 * | 5/2021 | Dotter | B01D 1/0035 |
| 11,235,985 | B2 * | 2/2022 | Cen | H02S 40/44 |
| 11,717,766 | B2 * | 8/2023 | Mehmi | C02F 1/42 |
| | | | | 203/10 |
| 2010/0305759 | A1 * | 12/2010 | Paragot | H04L 67/125 |
| | | | | 700/271 |
| 2010/0314238 | A1 * | 12/2010 | Frolov | C02F 1/14 |
| | | | | 203/10 |
| 2012/0112473 | A1 * | 5/2012 | Glynn | B01D 5/0081 |
| | | | | 290/1 R |
| 2013/0168224 | A1 * | 7/2013 | Godshall | C02F 1/16 |
| | | | | 202/172 |
| 2014/0298806 | A1 * | 10/2014 | Jeter | F03G 6/066 |
| | | | | 60/645 |
| 2015/0083575 | A1 * | 3/2015 | Al-Garni | F24T 10/10 |
| | | | | 202/185.3 |
| 2015/0143806 | A1 * | 5/2015 | Friesth | F03G 7/04 |
| | | | | 220/592.2 |
| 2018/0079662 | A1 * | 3/2018 | Bower | B01D 61/364 |
| 2018/0370816 | A1 * | 12/2018 | Bower | B01D 5/006 |
| 2020/0078701 | A1 * | 3/2020 | Mehmi | B01D 53/1475 |
| 2021/0017045 | A1 * | 1/2021 | Finger | B01D 3/145 |
| 2021/0269329 | A1 * | 9/2021 | Faizan | B01D 1/0011 |
| 2022/0007592 | A1 | 1/2022 | Bicer et al. | |

FOREIGN PATENT DOCUMENTS

| | | | | |
|---|---|---|---|---|
| IN | 202021035574 A | 10/2021 | | |
| WO | WO-2021047682 A1 * | 3/2021 | ............... | C02F 1/14 |

OTHER PUBLICATIONS

Faizan Ahmed, et al, "Design, Modelling and Optimization of a Novel Concentrated Solar Powered (CSP) Flash Desalination System Involving Direct Heating and Pressure Modulation Using Response Surface Methodology (RSM)", Sustainability, vol. 14, No. 18, Sep. 15, 2022, 14 pages.

Jiahang Huang, et al, "Key pathways for efficient solar thermal desalination", Energy Conversion and Management, vol. 299, 117806, Nov. 10, 2023, 36 pages.

Freshwater Generators, Multi Stage Flash Evaporators, Water & Waste, A Wartsila Business, 2021, 7 pages.

* cited by examiner

DESALINATION METHOD

CROSS-REFERENCE TO RELATED APPLICATIONS

The present application is a Divisional of U.S. application Ser. No. 18/975,601, pending, having a filing date of Dec. 10, 2024.

BACKGROUND

Technical Field

The present disclosure is directed to water desalination, and specifically relates to a sustainable desalination system using concentrated solar energy and photocatalysis for flash desalination.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Water scarcity is a significant global challenge due to population growth, industrial development and climate change. Desalination systems provide a solution by converting seawater and brackish water into potable water. Traditional desalination technologies include multi-stage flash (MSF) distillation, reverse osmosis (RO), and multi-effect distillation (MED). These processes are widely used for water purification but typically rely on fossil fuels and involve high energy consumption, impacting their economic feasibility and environmental sustainability. However, such traditional desalination systems face several challenges. MSF distillation requires substantial heat input, while RO uses energy-intensive high-pressure pumps. These traditional methods are often inefficient, especially when treating water with high organic or metallic contaminant levels. Furthermore, fossil fuel reliance in most desalination plants raises concerns about sustainability.

Some solutions have incorporated renewable energy sources into the desalination process. Solar desalination systems use solar thermal energy to evaporate water, while geothermal systems rely on underground heat. These approaches can reduce reliance on fossil fuels, but they are limited by solar energy availability and variable heat extraction from geothermal sources. For instance, solar energy availability is inconsistent, preventing continuous operation, while geothermal energy is not always accessible due to geological constraints. Moreover, such desalination systems do not efficiently handle water contaminated with heavy metals and organic compounds, requiring additional steps, such as extensive pre-treatment procedures, that increase operational costs and complexity.

US20220007592A1 described a greenhouse desalination system including a photovoltaic thermal system (PV/T) to meet the electricity requirements of the greenhouse and a multi-stage flash desalination system to fulfill the water requirements of the plants. The solar energy was utilized as a source of thermal energy input to a multi-stage flash desalination system. The heated fluid from the multi-stage flash desalination system was transferred to the vapor absorption cooling system. The desalination system (e.g., multi-stage flash desalination system) receives the pre-heated saline water and distills the pre-heated saline water. Further, IN202021035574A described a solar desalination system and method for simultaneously producing salt and soft water. The conversion process employs the use of nano-technology for increased heat transfer. The system converts sea/hard water to soft water and raw salt using solar energy conversion. Additionally, AU200181421A described a water desalination system heated by a solar tracking system which moves relative to a flash chamber. However, none of these references include additional heat generation sources which include thin-film photocatalyst-coated glass tubes illuminated by a ultraviolet (UV) light source and a geothermal energy-based pre-heating loop to ensure continuous operation of desalination process during the day and the night.

CN105731711A described a carbon nanotube/zinc oxide PTFE photo-catalytic film waste water processing device. The photo-catalysis reaction system comprised a quartz cold trap and a light source placed in the quartz cold trap. The carbon nanotube/zinc oxide nano-catalyst in the photo-catalysis function was configured to degrade the organic matter in the pesticide wastewater and purify it. However, this reference does not disclose thin-film photocatalyst-coated glass tubes illuminated by a UV light source, a flash chamber, a nano-fluid cooling loop in the condenser or a geothermal energy-based pre-heating loop for twenty-four hour operation of the desalination process.

US20200078701A1, incorporated herein by reference in its entirety, describes a system for generating potable water from source water containing an enclosed vessel, a heating unit, an air distributor, a condenser, and a collection vessel. A geothermal cooling condenser may comprise a heat exchanger in contact with the ground or groundwater, configured to extract or dissipate heat from the system, producing cooled air and a potable water condensate. However, this reference does not mention a hybrid system including reducing contaminants by thin-film photocatalyst-coated glass tubes, a solar preheater, a flash chamber, or a nano-fluid cooling loop which ensures twenty-four hour operation.

Each of the aforementioned references suffers from one or more drawbacks hindering their adoption, such as ensuring continuous twenty four hour and seasonal desalination and a method for contaminant removal, particularly of organic compounds. Accordingly, it is one object of the present disclosure to provide methods and systems for desalination, incorporating decontamination techniques, sustainable energy use, and automated control for continuous operation.

SUMMARY

In an exemplary embodiment, a desalination system is described. The desalination system comprises a feed tank fluidly connected to a feed water supply. The desalination system further comprises a feed pump fluidly connected to the feed tank. The desalination system further comprises a plurality of thin-filmed photocatalyst coated glass tubes fluidly connected to the feed pump. The feed pump is configured to pump the feed water from the feed tank through the plurality of thin-filmed photocatalyst coated glass tubes. The plurality of thin-filmed photocatalyst coated glass tubes are configured to perform, e.g., catalyze, a photocatalytic cleaning reaction which removes contaminants from the feed water. The desalination system further comprises a first flow control valve connected to the plurality of photo-catalyst coated glass tubes. The first flow control valve has a first mode in which the contaminant-free feed water is fluidly directed towards a feed water heater which is configured to pre-heat the contaminant-free clean water and a second mode in which the contaminant-free feed water is fluidly directed into a geothermal energy based heat exchanger. The desalination system further comprises a second flow control valve configured to fluidly direct a first portion of the pre-heated contaminant-free feed water into a thermal energy storage tank and a second portion of the pre-heated contaminant-free feed water into a flash chamber. The flash chamber is configured to generate steam by flash heating the pre-heated contaminant-free feed water. The desalination system further comprises a condenser connected to the flash chamber. The condenser includes a nano-fluid cooling coil. The condenser is configured to condense the steam into potable water. The desalination system further comprises a distillate collection tank located beneath the condenser. The distillate collection tank is configured to collect potable water.

In another exemplary embodiment, a desalination method is described. The desalination method comprises removing contaminants from a feed water by pumping, by a feed pump fluidly connected to a feed tank, the feed water through a plurality of thin-filmed photocatalyst coated glass tubes. The desalination method further comprises measuring, by a light sensor, an intensity of solar radiation falling upon a feed water heater. When the intensity of the solar radiation is equal to or above a threshold intensity, in a first mode of a first flow control valve connected to an outlet of the thin-filmed photocatalyst coated glass tubes, the desalination method comprises directing the contaminant-free feed water to the feed water heater; pre-heating, by the feed water heater, the contaminant-free clean water; and directing, by a second flow control valve, a first portion of the pre-heated contaminant-free feed water into a thermal energy storage tank and a second portion of the pre-heated contaminant-free feed water into a flash chamber. When the intensity of the solar radiation is below the threshold intensity, in a second mode of the first flow control valve, the desalination method comprises directing the contaminant-free feed water through a geothermal energy based heat exchanger; pre-heating the contaminant-free feed water in the geothermal energy based heat exchanger; and directing the pre-heated contaminant-free feed water into the thermal energy storage tank, and injecting the pre-heated contaminant-free feed water into the flash chamber. The desalination method further comprises generating, within the flash chamber, steam by flash heating the pre-heated contaminant-free feed water. The desalination method further comprises condensing, within a condenser connected to the flash chamber. The condenser includes a nano-fluid cooling coil, the steam into potable water. The desalination method further comprises collecting the potable water in a distillation tank located beneath the condenser.

In yet another exemplary embodiment, a method of controlling a desalination system is described. The method comprises receiving, by a microprocessor including electrical circuitry, a memory storing program instructions and at least one processor, light intensity measurements from the light sensor operatively connected to the desalination system. The method further comprises executing, by the processor, the program instructions to control a feed pump, a first flow control valve, a second flow control valve, a nanofluid pump, a vacuum pump, a switch of an electric powered ultraviolet (UV) light source and a heating element located within interior walls of a flash chamber based on the light intensity measurements from the light sensor. The method further comprises producing potable water from feed water.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
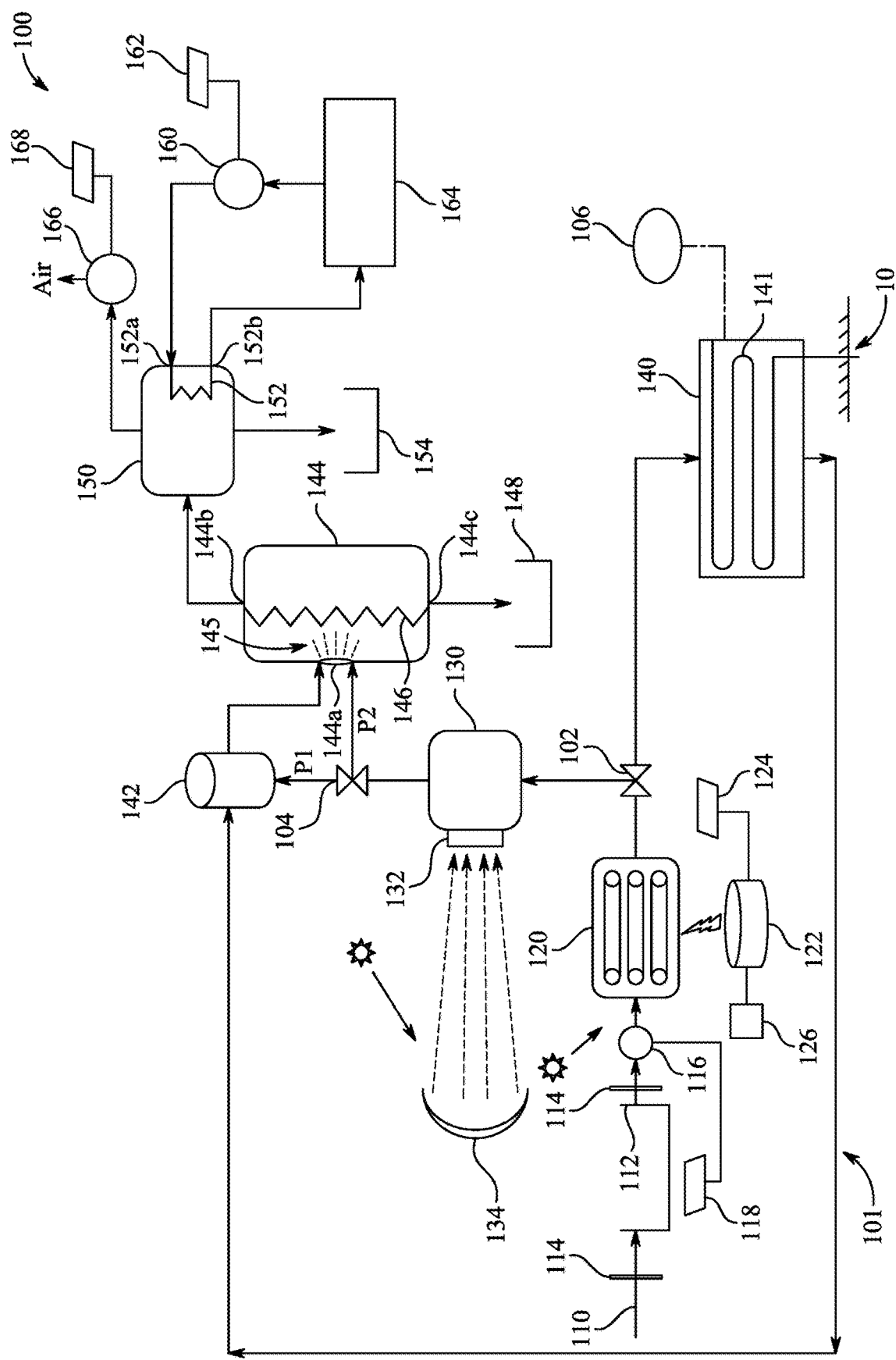
FIG. 1A is a schematic diagram of a desalination system, according to certain embodiments.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Aspects of this disclosure are directed to a system and methods for desalination that utilize renewable energy sources to efficiently convert saline water into potable water. The system and methods of the present disclosure incorporate technologies to ensure effective contaminant removal, continuous day-and-night operation, and optimized thermal energy management for sustainable and efficient desalination. The system and methods of the present disclosure ensure consistent water production while minimizing environmental impact and operational costs through efficient energy usage and control mechanisms.

FIG. 1A illustrates a desalination system 100 which provides a solution for converting saline water into potable water using renewable energy sources. The desalination system 100 operates continuously throughout day and night, harnessing solar energy and geothermal energy efficiently and incorporating pre-treatment and energy management mechanisms. Thermal energy storage and geothermal pre-heating are utilized for maintaining consistent and reliable operation, even during periods of low sunlight. The desalination system 100 is also capable of removing various contaminants from feed water through a pre-treatment stage and subsequently directing the purified water through multiple stages to ensure optimal desalination. The desalination system 100 further implements a control mechanism to monitor and adjust the flow of feed water and energy distribution to adapt to varying environmental conditions.

As illustrated in FIG. 1A, the desalination system 100 includes a first flow control valve 102 and a second flow control valve 104, which work together to facilitate continuous and efficient operation. The first flow control valve 102 has a first mode and a second mode of operation to direct the flow of feed water based on the operational requirements of the desalination system 100. By switching between the first mode and the second mode, the first flow control valve 102 facilitates the desalination system 100 to control the treatment of feed water under varying conditions, such as changes in energy availability or feed water temperature. Such control ensures that the desalination system 100 can continuously adapt to fluctuating environmental and operational factors, maintaining uninterrupted desalination operation. The second flow control valve 104 is configured to manage the distribution of feed water between different stages of the desalination process.

The desalination system 100 includes a feed water supply 110. The feed water supply 110 is the primary source of feed water (saline water) for the desalination system 100. The feed water supply 110 typically includes an external reservoir, such as a natural body of water or an industrial source containing saline water. Such source is selected to ensure an adequate supply of saline water that can be processed through the desalination system 100 and converted into potable water. The desalination system 100 also includes a feed tank 112 fluidly connected to the feed water supply 110. The feed tank 112 collects and stores the feed water from the feed water supply 110 before it is processed further. The feed tank 112 acts as a holding reservoir, ensuring that the desalination system 100 has a steady and consistent supply of saline water. This facilitates managing fluctuations in the feed water supply and maintaining a continuous operation. The feed tank 112 is typically sized to accommodate variations in water demand and supply and includes appropriate connections for subsequent processing stages. The feed tank 112 may include screens, mixers, settling tanks and the like to remove particulate matter from the feed water.

The desalination system 100 further includes a feed pump 116 fluidly connected to the feed tank 112. The feed pump 116 provides the necessary pressure to move the feed water from the feed tank 112 to subsequent components of the desalination system 100. By maintaining a consistent flow rate and pressure, the feed pump 116 helps ensure that the desalination process can proceed efficiently. For present purposes, the feed pump 116 is designed for handling saline water to minimize the risk of corrosion or damage. In some examples, the desalination system 100 also includes one or more filter screens 114 located between the feed water supply 110 and the feed tank 112, as well as between the feed tank 112 and the feed pump 116. These filter screens 114 remove large particles, debris, and other contaminants from the feed water before it enters the feed tank 112 or feed pump 116. This prevents blockages or damage to downstream equipment and ensures that the desalination system 100 can operate efficiently. The filter screens 114 may be easily removable/detachable to provide for their easy and fast cleaning and replacement. The filter screens 114 provide initial filtration, thereby improving the quality of water entering subsequent stages of treatment and increasing the lifespan of components of the desalination system 100.

The desalination system 100 further includes a plurality of thin-filmed photocatalyst coated glass tubes 120. The thin-filmed photocatalyst coated glass tubes 120 are fluidly connected to the feed pump 116. The feed pump 116 is configured to pump the feed water from the feed tank 112 through the thin-filmed photocatalyst coated glass tubes 120. The thin-filmed photocatalyst coated glass tubes 120 are configured to expose the feed water to a photocatalytic cleaning reaction, where contaminants are removed through the action of the thin film of the photocatalyst material coating the glass tubes. The photocatalyst material is specifically configured to absorb sunlight or ultraviolet light to form an activated state and initiate or catalyze a chemical reaction that results in the break down of organic compounds into smaller molecules. The photocatalyst material may also catalyze reaction involving traces of heavy metals and other contaminants thereby forming products that are more easily separated from water such as by precipitation, distillation or aspiration. This reaction facilitates effective pre-treatment of the feed water, reducing impurities and preparing the water for subsequent desalination stages. The thin-filmed photocatalyst coated glass tubes 120 are arranged to ensure maximum exposure of the feed water to the photocatalyst surface, thus maximizing the efficiency of the photocatalytic cleaning reaction. Such structure and configuration of these tubes facilitate efficient and uniform exposure of the feed water to the photocatalyst surface.

In an aspect of the present disclosure, the photocatalyst is titanium dioxide. Titanium dioxide is known for its high photocatalytic activity and durability, making it an effective material for removing a wide range of contaminants from feed water. The titanium dioxide coating on the glass tubes 120 forms a thin film that reacts with ultraviolet light or direct sunlight, initiating a photocatalytic reaction. This reaction generates highly reactive radicals that break down organic compounds, traces of heavy metals, and other contaminants in the feed water. The titanium dioxide photocatalyst provides consistent performance, even under varying light conditions, ensuring that the photocatalytic cleaning reaction remains efficient. The titanium dioxide has high stability and resistance to corrosion which aids the photocatalyst in maintaining effectiveness over long periods, providing a reliable pre-treatment stage for the desalination system 100.

The titanium dioxide is preferably present as a continuous layer covering an interior surface of the glass tubes, for example a continuous layer than coats at most 50% of the interior surface of the glass tubes uniformly and continuously along the axis of the glass tubes. The coating may be continuous over one hemisphere of the interior surface of the glass tubes. The titanium dioxide thin film preferably has a thickness of 0.5 µm to 100 µm or 10 µm to 50 µm. In a preferable embodiment the photocatalyst is a combination of a continuous hemispherical layer of a titanium dioxide thin film onto which copper metal islands are dispersed. The copper metal is present in a weight ratio to the titanium dioxide of from (0.01 to 1):(10 to 1000), preferably 0.1-1: 100-500 or about 1:150. The copper is in the form of metal particulates projecting from the surface of the titanium dioxide layer. The copper metal may participate in the charge transfer processes involving the interaction of photocatalytically activated titanium dioxide with contaminants present in the water.

The desalination system 100 further includes an electric powered ultraviolet (UV) light source 122 configured to illuminate the thin-filmed photocatalyst coated glass tubes 120 during hours of the day and the night when there is insufficient sunlight to generate the photocatalytic cleaning reaction. The electric powered UV light source 122 ensures that the thin-filmed photocatalyst coated glass tubes 120 remain continuously active, aiding them to break down organic compounds, heavy metals, and other impurities from the feed water before it moves to the next stage of the desalination system 100. The electric powered UV light source 122 is used during both the day and the night to ensure the photocatalytic cleaning reaction occurs consistently, even when there is insufficient sunlight to activate the photocatalyst. During the day, the electric powered UV light source 122 is turned on in cloudy or low-light conditions to supplement natural sunlight, to maintain continuous photocatalytic cleaning reaction. At night, when no sunlight is available, the electric powered UV light source 122 completely replaces the role of natural sunlight, ensuring that the photocatalytic cleaning reaction can still take place. This ensures that the feed water is continuously pre-treated, providing for a consistent quality of pre-treated feed water. In this embodiment of the invention, the thin film is preferably present as substantially equi-areal continuous quarter sections extending along the length of the glass tubes with four quarter sections equally spaced on the interior of the glass tubes. The UV light source is preferably an extended tube-like fixture present proximal to or on the exterior of the glass tubes, each UV light fixture having a length substantially the same as the length of the glass tubes and all tube-like UV fixtures mounted in a common hemisphere of each tube.

The desalination system 100 further includes a feed water heater 130 which is configured to pre-heat the feed water. The feed water heater 130 receives the contaminant-free feed water after it passes through the thin-filmed photocatalyst coated glass tubes 120. The feed water heater 130 is configured to raise the temperature of the feed water before it continues to the subsequent desalination stages. Pre-heating the feed water significantly improves the efficiency of the overall desalination process by reducing the amount of energy required in later stages, where rapid vaporization may take place (as discussed later). By pre-heating the contaminant-free feed water efficiently using the feed water heater 130, the desalination system 100 can store thermal energy in the water, which is required for maintaining consistent desalination even during periods of low sunlight or varying conditions.

As illustrated in FIG. 1A, the desalination system 100 includes an absorber plate 132 connected to the feed water heater 130. The absorber plate 132 is made of highly conductive materials such as copper or aluminum. In a non-limiting example, the shape of the absorber plate 132 can be rectangular, circular, or triangular, depending on the design requirements. The desalination system 100 further includes a solar energy concentrator 134. The solar energy concentrator 134 is configured to direct and concentrate sunlight towards the absorber plate 132. In a non-limiting example, the solar energy concentrator 134 can be of any suitable type, such as a parabolic dish, a parabolic trough, or a Fresnel lens. The purpose of the solar energy concentrator 134 is to concentrate the solar energy onto the absorber plate 132. The concentrated solar energy incident on the absorber plate 132 causes rapid heating of the absorber plate 132, which, in turn, is used for pre-heating the contaminant-free feed water by the feed water heater 130.

The desalination system 100 further incorporates a geothermal energy pre-heating loop 101 including a geothermal energy based heat exchanger 140. The geothermal energy based heat exchanger 140 facilitates the desalination system 100 to operate during periods when there is insufficient solar radiation to power the feed water heater 130 by the solar energy concentrator 134. The geothermal energy based heat exchanger 140 is configured to pre-heat the contaminant-free feed water by exchanging thermal energy with an underground layer 10. The underground layer 10 refers to subsurface layers of the earth, which contain geothermal energy in the form of heat. To facilitate the exchange of thermal energy between the contaminant-free feed water and the underground layer 10, the geothermal energy based heat exchanger 140 includes a plurality of connected pipes 141. These pipes 141 are buried within the underground layer 10 at a depth at which the temperature is suitable for efficient heat transfer. The depth at which the pipes 141 are buried can vary depending on the local geological conditions and the desired operating temperature range.

It may be appreciated that the plurality of connected pipes 141 can be arranged in various configurations, such as horizontal, vertical, or spiral layouts. The choice of configuration depends on factors such as the available space, the desired heat transfer area, and the local geology. Regardless of the configuration, the pipes 141 are designed to maximize the surface area exposed to the underground layer 10, thereby enhancing the heat transfer rate. The pipes 141 are typically made of materials with high thermal conductivity, such as copper or aluminum, to facilitate efficient heat transfer between the underground layer 10 and the fluid flowing through the pipes 141. In some examples, the pipes 141 may be filled with a heat transfer fluid, such as water or a glycol-based solution, to improve the heat transfer process. The pipes 141 may be used to transfer heat to the decontaminated feed water, which may flow around the pipes in the heat exchanger 140. Alternatively, the pipes, without a heat transfer fluid, may transport the decontaminated feed water through the heat exchanger 140 to exchange heat with the underground layer 10.

The desalination system 100 also includes a thermal energy storage tank 142. The thermal energy storage tank 142 facilitates continuous operation of the desalination system 100, during periods when there is insufficient solar radiation or when the geothermal energy based heat exchanger 140 is in operation. The thermal energy storage tank 142 may contain energy storage materials such as phase change materials or molten salt. The thermal energy storage tank 142 is configured to store the pre-heated contaminant-free feed water. This pre-heated water may be received from either the feed water heater 130 during periods of sufficient solar radiation or from the geothermal energy based heat exchanger 140 during periods of low or no solar radiation. The thermal energy storage tank 142 is typically insulated to minimize heat loss and maintain the temperature of the stored pre-heated contaminant-free feed water. The capacity of the thermal energy storage tank 142 is determined based on the expected demand for potable water and the desired duration of continuous operation during periods of low or no solar radiation.

The desalination system 100 further includes a flash chamber 144. The flash chamber 144 is a component in which the actual desalination process occurs. The flash chamber 144 includes an inlet port 144*a*. The inlet port 144*a* is connected to the second flow control valve 104 and the thermal energy storage tank 142. The inlet port 144*a* is configured with a plurality of spray nozzles 145. The spray nozzles 145 are configured to introduce the pre-heated contaminant-free feed water into the flash chamber 144 in the form of fine droplets or a spray pattern. This increased surface area exposure facilitates efficient flash evaporation of the pre-heated water. The flash chamber 144 also includes a heating element 146 located within its interior walls. The heating element 146 provides additional heat energy to the pre-heated contaminant-free feed water, further promoting the flash evaporation process. The heating element 146 can be powered by various sources, such as electricity (from renewable sources) or fossil fuels, depending on the specific design and operational requirements of the desalination system 100.

As discussed, the desalination system 100 incorporates the first flow control valve 102 and the second flow control valve 104. The first flow control valve 102 is connected to the plurality of thin-filmed photocatalyst coated glass tubes 120. During the first mode of operation, the first flow control valve 102 directs the contaminant-free feed water from the plurality of thin-filmed photocatalyst coated glass tubes 120 towards the feed water heater 130. As the contaminant-free feed water flows through the feed water heater 130, it comes in thermal contact (directly or indirectly, in the feed water heater 130) with the absorber plate 132, which is heated by the concentrated solar energy from the solar energy concentrator 134. The heat from the absorber plate 132 is transferred to the contaminant-free feed water, resulting in pre-heating of the feed water. The pre-heated contaminant-free feed water then exits the feed water heater 130 and is directed by the second flow control valve 104 towards either the thermal energy storage tank 142 or the flash chamber 144, depending on operating conditions and energy storage requirements of the desalination system 100.

During the second mode of operation, when the intensity of solar radiation is insufficient (below a threshold intensity, as discussed later), the first flow control valve 102 directs the contaminant-free feed water from the plurality of thin-filmed photocatalyst coated glass tubes 120 towards the geothermal energy based heat exchanger 140. The feed pump 116 circulates the contaminant-free feed water through the plurality of connected pipes 141 buried within the underground layer 10. As the contaminant-free feed water flows through the pipes 141, thermal energy from the surrounding underground layer 10 is absorbed through thermal conduction. The heat transfer occurs due to the temperature difference between the underground layer 10 and the fluid inside the pipes 141. Thus, by incorporating the geothermal energy based heat exchanger 140, the desalination system 100 can continue to operate and produce potable water even during periods of low or no solar radiation, ensuring a consistent and reliable supply of fresh water.

The pre-heated contaminant-free feed water then exits the geothermal energy based heat exchanger 140 and passed to the thermal energy storage tank 142. The feed pump 116 is configured to pump the pre-heated contaminant-free feed water to the thermal energy storage tank 142. In particular, the second flow control valve 104 is responsible for regulating the flow of the pre-heated contaminant-free feed water from the feed water heater 130 or the geothermal energy based heat exchanger 140. The second flow control valve 104 is configured to fluidly direct a first portion 'P1' of the pre-heated contaminant-free feed water from the feed water heater 130 into the thermal energy storage tank 142. The thermal energy storage tank 142 serves as a buffer, storing the pre-heated water until it is required for the flash desalination process in the flash chamber 144. This storage capability facilitates the desalination system 100 to operate continuously, even during periods when the pre-heating sources (solar or geothermal) are temporarily unavailable.

The second flow control valve 104 is further configured to fluidly direct a second portion 'P2' of the pre-heated contaminant-free feed water into the flash chamber 144. Also, the thermal energy storage tank 142 is configured to release the pre-heated contaminant-free water to the flash chamber 144. As discussed, the flash chamber 144 is designed to facilitate the rapid phase change of the pre-heated contaminant-free feed water from liquid to vapor. This phase change is achieved by exposing the pre-heated water to a low-pressure environment within the flash chamber 144. The pre-heated water is introduced into the flash chamber 144 through the plurality of spray nozzles 145, which increase the surface area exposed to the low-pressure environment, enhancing the rate of evaporation. Additionally, the heating element 146, located within the interior walls of the flash chamber 144, provides additional thermal energy to the pre-heated water, further promoting the flash evaporation process and increasing the overall efficiency of the desalination system 100.

The flash chamber 144 also includes a steam outlet port 144b. As the pre-heated contaminant-free feed water flashes into steam within the flash chamber 144, the generated steam exits through the steam outlet port 144b. The flash chamber 144 further includes a brine outlet port 144c. During the flash evaporation process, a concentrated brine solution remains in the flash chamber 144 after the pure water vapor has been extracted. This concentrated brine solution exits the flash chamber 144 through the brine outlet port 144c and is collected in a brine collection tank 148. For this purpose, the brine collection tank 148 is connected to the brine outlet port 144c of the flash chamber 144. The brine collection tank 148 serves as a reservoir for the concentrated brine solution that is left behind after the desalination process. The brine solution typically contains dissolved salts, minerals, and other impurities that were present in the original feed water. The brine solution may be stored for later brine processing which removes the salts from the brine solution. These salts may be a marketable by-product of the desalination system.

It may be appreciated that the design and configuration of the flash chamber 144, including the size, shape, and arrangement of the inlet port 144a, the spray nozzles 145, the heating element 146, the steam outlet port 144b, and the brine outlet port 144c, influence the overall efficiency and performance of the desalination system 100. These components work in synergy to facilitate the flash evaporation process and separate the pure water vapor from the concentrated brine solution, producing potable water.

In an example, the flash chamber 144 implements a Multi-Stage Flash (MSF) distillation process. This process involves multiple stages within the flash chamber 144 where the pre-heated contaminant-free feed water is sequentially flashed into steam and condensate at progressively lower pressures. Each stage within the flash chamber 144 is designed to operate at a lower pressure than the preceding one, aiding a portion of the feed water to vaporize into steam as the pressure drops. This sequential flashing utilizes the latent heat released from the condensation of steam in earlier stages to heat the remaining brine, making the process energy efficient. In some examples, the flash chamber 144 may further incorporate internal components such as demisters, which prevent droplet carryover, and heat exchangers, which recover heat from the condensing steam to pre-heat incoming feed water. As a result of this configuration, the flash chamber 144 in the desalination system 100 can effectively produce potable water by condensing the steam in the lower pressure stages, while the remaining brine gets progressively more concentrated and is finally discharged.

In a non-limiting example, the multi-stage flash distillation chamber may be a Multi-Stage Flash (MSF) evaporator manufactured by Wartsila, located in Herndon, Virginia, U.S.A.

The desalination system 100 further includes a brine collection tank 148 located beneath the flash chamber 144. The brine collection tank 148 is configured to store a brine water by-product released by the pre-heated contaminant-free feed water during conversion to steam, by the flash chamber 144. As the pre-heated feed water enters the flash chamber 144, it undergoes rapid vaporization due to the pressure difference between the flash chamber 144 and the condenser 150, causing the water to separate into steam and a concentrated brine water by-product. The brine water, which remains after the steam has been produced, is collected at the bottom of the flash chamber 144 and flows directly into the brine collection tank 148. The brine collection tank 148 is designed to handle the high salinity levels of the brine water by-product and prevent leakage or contamination. The brine collection tank 148 provides an efficient way to manage the brine water by-product, preventing it from interfering with other components of the system.

Further, as illustrated in FIG. 1A, the desalination system 100 also includes a condenser 150 connected to the flash chamber 144. The condenser 150 is responsible for converting steam into potable water. The steam outlet port 144b of the flash chamber 144 is connected to the condenser 150. As the pre-heated contaminant-free feed water flashes into steam within the flash chamber 144, the generated steam exits through the steam outlet port 144b and enters the condenser 150 for condensation and collection as potable water. The condenser 150 is designed with a nano-fluid cooling coil 152, which utilizes a high-thermal-conductivity nano-fluid to efficiently transfer heat away from the steam. The nano-fluid cooling coil 152 ensures that the steam produced in the flash chamber 144 undergoes rapid condensation. Specifically, as steam from the flash chamber 144 enters the condenser 150, it comes into contact with the surface of the nano-fluid cooling coil 152, which is filled with the nano-fluid. The nano-fluid inside the nano-fluid cooling coil 152 facilitates heat exchange due to its heat transfer properties, leading to effective condensation of the steam into liquid form. By incorporating the nano-fluid cooling coil 152, the condenser 150 significantly enhances the rate of heat transfer, facilitating the desalination system 100 to achieve efficient condensation. This design ensures a steady supply of potable water while minimizing energy usage and maintaining consistent operation.

The desalination system 100 further incorporates a nano-fluid cooling loop to facilitate efficient condensation of the steam generated in the flash chamber 144. As illustrated, the desalination system 100 includes a nanofluid pump 160 fluidly connected to a first end 152a of the nano-fluid cooling coil 152. The desalination system 100 also includes a cold nanofluid tank 164 fluidly connected between a second end 152b of the nano-fluid cooling coil 152 and the nanofluid pump 160. Herein, the nanofluid pump 160 is configured to pump a cold nanofluid from the cold nanofluid tank 164 through the nano-fluid cooling coil 152 to condense the steam into potable water. The nanofluid pump 160 is designed to circulate the nanofluid through the cooling coil 152, ensuring that the nanofluid remains cold and effective in transferring heat. Specifically, as the nanofluid moves through the nano-fluid cooling coil 152, it absorbs heat from the steam produced in the flash chamber 144, facilitating the condensation of steam into potable water. After absorbing the heat, the warmed nanofluid exits through the second end 152b and is returned to the cold nanofluid tank 164, where it is cooled down. The nanofluid pump 160 then recirculates the cooled nanofluid back through the cooling coil 152, creating a continuous loop. This configuration ensures that the steam is efficiently condensed into potable water. The use of the nanofluid pump 160 and cold nanofluid tank 164 provides for consistent cooling, facilitating the desalination system 100 to maintain continuous production of potable water. The nano-particles comprising the nanofluid may be selected from the group comprising zinc oxide ZnO, aluminum oxide $Al_2O_3$, titanium dioxide $TiO_2$ and boron nitride BN.

The desalination system 100 further includes a distillate collection tank 154 located beneath the condenser 150. The distillate collection tank 154 is configured to collect potable water. The positioning of the distillate collection tank 154 directly beneath the condenser 150 ensures that all condensed water is efficiently channeled into the distillate collection tank 154 without loss. In particular, the condensed steam, now potable water, from the condenser 150 is collected in the distillate collection tank 154 for further distribution or use. The distillate collection tank 154 is designed to handle the volume of potable water generated by the desalination system 100. The distillate collection tank 154 may include suitable connections and outlets for controlled discharge of the collected potable water to a designated reservoir or distribution network.

The desalination system 100 also includes a vacuum pump 166 connected to the condenser 150. The vacuum pump 166 is configured to remove excess air from the condenser 150 to create a low-pressure environment, facilitating the condensation of steam into potable water. By removing the excess air, the vacuum pump 166 reduces the overall pressure inside the condenser 150, which enhances the efficiency of steam condensation by increasing the pressure differential between the flash chamber 144 and the condenser 150. This low-pressure environment facilitates the steam to flow rapidly from the flash chamber 144 into the condenser 150 and condense it into potable water. For purposes of the present disclosure, the vacuum pump 166 may be configured to maintain a consistent vacuum level, ensuring continuous and efficient operation of the desalination system 100.

In some aspects of the present disclosure, the desalination system 100 further includes photovoltaic (PV) panels, each with a storage battery, to provide a consistent, renewable power supply to various system components. Specifically, the desalination system 100 includes a first photovoltaic (PV) panel 118 including a storage battery (not separately shown) operatively connected to the feed pump 116. The first PV panel 118 provides a steady supply of solar-generated electricity (renewable energy), to facilitate the feed pump 116 to operate continuously, even when sunlight is not available, by drawing from the charged battery. The desalination system 100 also includes a second photovoltaic (PV) panel 124 including a storage battery (not separately shown) operatively connected to the electric powered UV light source 122. This facilitates the electric powered UV light source 122 to illuminate the thin-filmed photocatalyst coated glass tubes 120 throughout the day and night, ensuring uninterrupted photocatalytic reaction even during periods of insufficient sunlight. In an aspect, the desalination system 100 further also a switch 126 associated with the electric powered UV light source 122. The switch 126, associated with the electric powered UV light source 122, serves as a control mechanism to turn the electric powered UV light source 122 on or off as required. The switch 126 is typically integrated into an electrical circuit that powers the electric powered UV light source 122 and can be controlled manually or automatically.

The desalination system 100 further includes a third photovoltaic (PV) panel 162 including a storage battery (not separately shown) operatively connected to the nanofluid pump 160. This arrangement provides the necessary power to circulate the cooling nanofluid through the nano-fluid cooling coil 152, ensuring that the nanofluid pump 160 maintains a consistent flow, and facilitating the condenser 150 to efficiently condense steam into potable water. The desalination system 100 further includes a fourth photovoltaic (PV) panel 168 including a storage battery (not separately shown) operatively connected to the vacuum pump 166. This arrangement helps to maintain a low-pressure environment in the condenser 150 by removing excess air, ensuring that steam can condense efficiently into potable water. These PV panels 118, 124, 162, 168, each with the storage battery, ensure that the components of the desalination system 100 receive a consistent power supply. This configuration facilitates continuous and efficient operation, utilizing renewable solar energy to minimize the environmental impact and operational costs.

In an aspect of the present disclosure, as illustrated in FIG. 1A, the desalination system 100 further includes a light sensor 106 connected to the geothermal energy based heat exchanger 140. It may be understood that the light sensor 106 may be indirectly connected to the geothermal energy based heat exchanger 140, as discussed below. The function of the light sensor 106 is to measure the intensity of solar radiation falling on the desalination system 100. This measurement provides for determining the appropriate mode of operation for the desalination system 100, as it provides whether the feed water should be pre-heated by the solar-powered feed water heater 130 or the geothermal energy based heat exchanger 140. The light sensor 106 can be a photodiode, photoresistor, or any other suitable device capable of detecting and quantifying the intensity of solar radiation.

Figure 1B:
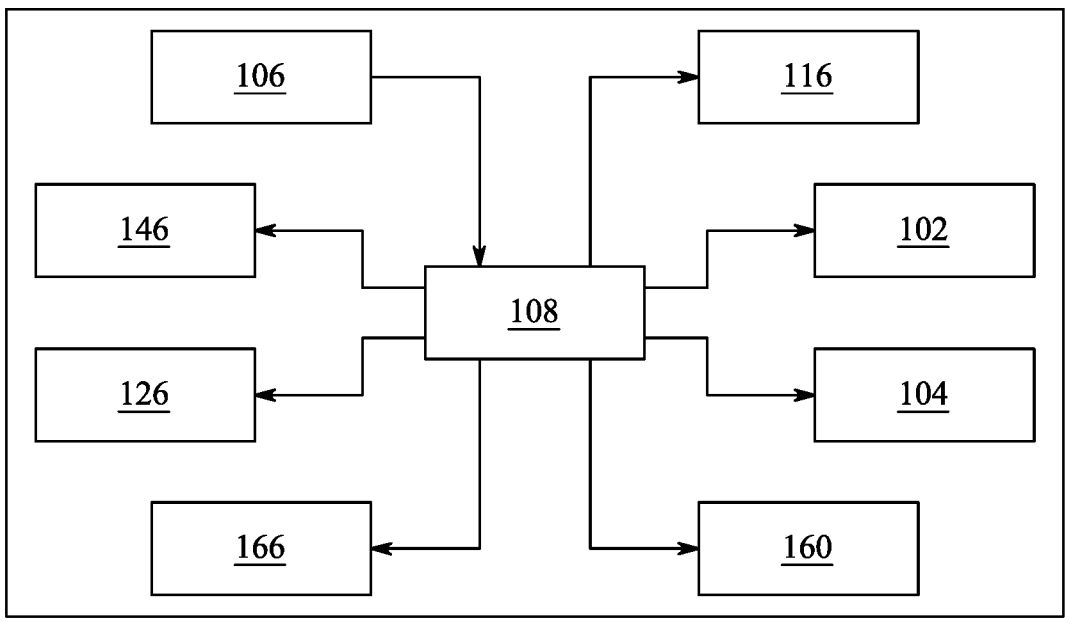
FIG. 1B is a schematic diagram of a control scheme for the desalination system, according to certain embodiments.

The desalination system 100 further includes a microprocessor 108 (as shown in FIG. 1B). As illustrated in FIG. 1B, the microprocessor 108 includes electrical circuitry, a memory for storing program instructions, and at least one processor for executing those instructions. The microprocessor 108 is operatively connected to various components of the desalination system 100, facilitating it to monitor and control their operation. Specifically, the microprocessor 108 is operatively connected to the feed pump 116, the first flow control valve 102, the second flow control valve 104, the nanofluid pump 160, the vacuum pump 166, the switch 126 of the electric powered UV light source 122 and the heating element 146 located within the interior walls of the flash chamber 144. Thereby, the microprocessor 108 can control the operation of the feed pump 116, adjusting its speed or turning it on/off as required. Further, the microprocessor 108 can actuate the first flow control valve 102, switching between the first mode (directing contaminant-free feed water to the feed water heater 130) and the second mode (directing contaminant-free feed water to the geothermal energy based heat exchanger 140). The microprocessor 108 can control the second flow control valve 104, regulating the flow of pre-heated contaminant-free feed water into the thermal energy storage tank 142 and the flash chamber 144. The microprocessor 108 can regulate the operation of the nanofluid pump 160, adjusting its speed or turning it on/off as needed. The microprocessor 108 can control the vacuum pump 166, which is responsible for removing excess air from the condenser 150. The microprocessor 108 can activate or deactivate the switch 126, turning the electric powered UV light source 122 on or off as required. The microprocessor 108 can control the heating element 146, adjusting its temperature or turning it on/off as needed to facilitate the flash evaporation process.

Herein, the microprocessor 108 is operatively connected to receive data signals from the light sensor 106. Specifically, the microprocessor 108 receives input data from various sensors, including the light sensor 106, as well as temperature and pressure sensors located throughout the system. Based on this input data and the program instructions stored in its memory, the microprocessor 108 can make decisions and send control signals to the various components of the desalination system 100. For example, if the light sensor 106 indicates that the solar radiation intensity has dropped below a predetermined threshold, the microprocessor 108 can switch the first flow control valve 102 to the second mode, directing the contaminant-free feed water to the geothermal energy based heat exchanger 140 instead of the feed water heater 130. Additionally, the microprocessor 108 can activate the switch 126 to turn on the electric powered UV light source 122, ensuring that the photocatalytic cleaning reaction continues even in low-light conditions. Herein, the processor is configured to execute the program instructions to control the feed pump 116, the first flow control valve 102, the second flow control valve 104, the nanofluid pump 160, the vacuum pump 166, the switch 126 of the electric powered ultraviolet (UV) light source 122 and the heating element 146 located within the interior walls of the flash chamber 144 based on the data signals from the light sensor 106.

In some examples, the desalination system 100 may include temperature sensor(s) and pressure sensor(s) (not shown in FIG. 1A) on each loop, including temperature and pressure sensors on the condenser 150, to provide information for operating the vacuum pump 166 and other components. These sensors constantly monitor the conditions in the various loops, including those for the flash chamber 144 and the condenser 150, to ensure that each section of the desalination system 100 operates within optimal parameters. The microprocessor 108 receives data from these sensors and uses the information to determine the operation of the first flow control valve 102 and the second flow control valve 104. By analyzing the temperature and pressure readings, the microprocessor 108 can adjust the flow of feed water to ensure efficient desalination. The microprocessor 108 can also send control signals to switches of the nanofluid pump 160, the vacuum pump 166, and other pumps as required, ensuring that each pump operates only when necessary. Specifically, for the vacuum pump 166, the temperature and pressure sensors on the condenser 150 provide data to the microprocessor 108, which can then regulate operation of the vacuum pump 166 to maintain optimal pressure within the condenser 150. This ensures that excess air and gases are effectively removed, creating a low-pressure environment that promotes efficient condensation of steam into potable water.

Figure 1C:
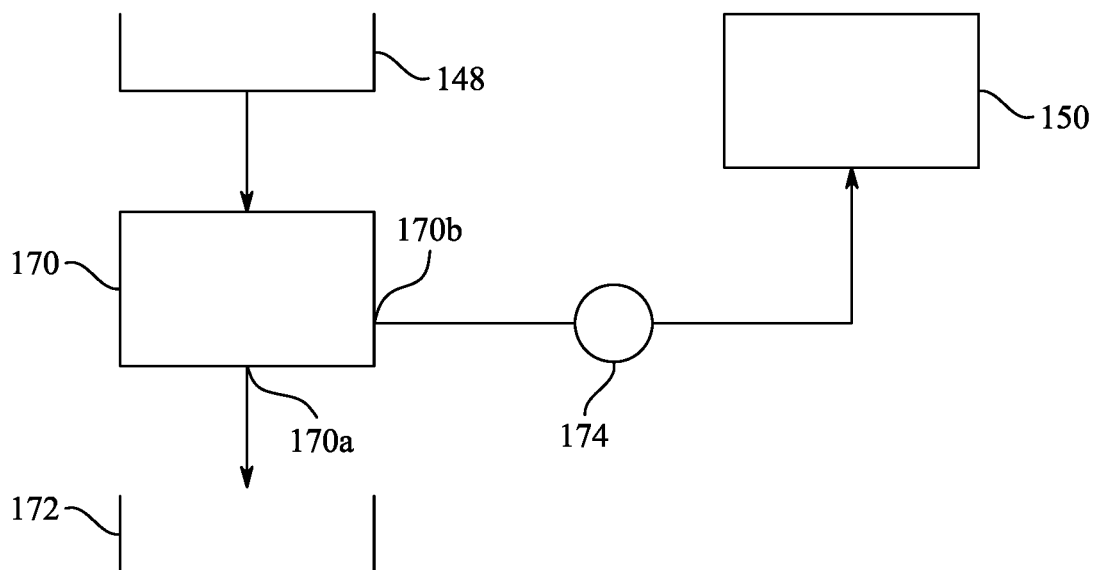
FIG. 1C is a schematic diagram of a brine processing loop for the desalination system, according to certain embodiments.

As discussed with respect to FIG. 1A, the brine collection tank 148 is configured to store a brine water by-product released by the pre-heated contaminant-free feed water during conversion to steam in the flash chamber 144. In an aspect of the present disclosure, as illustrated in FIG. 1C, the desalination system 100 additionally includes a brine boiler 170 fluidly connected to the brine collection tank 148. The brine boiler 170 is configured to receive the brine water by-product from the brine collection tank 148 and boil the brine water by-product to produce salt and steam vapor. The brine boiler 170 includes a salt outlet port 170a to discharge the produced salt to a salt storage tank 172. The brine boiler 170 also includes a steam outlet port 170b fluidly connected to the condenser 150, via a steam pump 174. The steam vapor produced in the brine boiler 170 is directed by the steam pump 174, through the steam outlet port 170b, into the condenser 150 to be condensed along with the steam from the flash chamber 144. This arrangement minimizes the pollution risk associated with dumping brine water, while providing valuable salt as a by-product.

Figure 2:
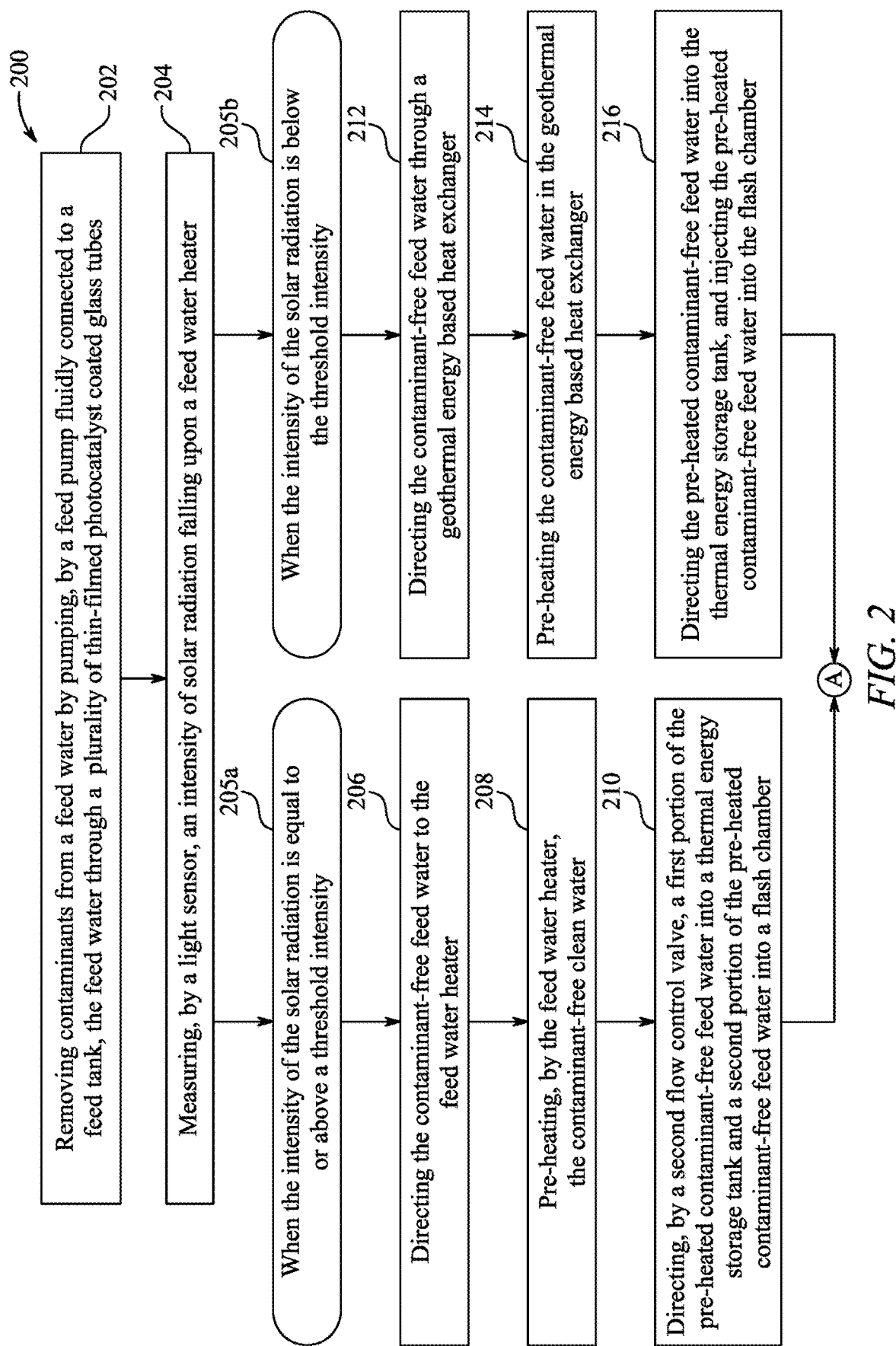
FIG. 2 is an exemplary flowchart of a desalination method, according to certain embodiments.
Figure 2:
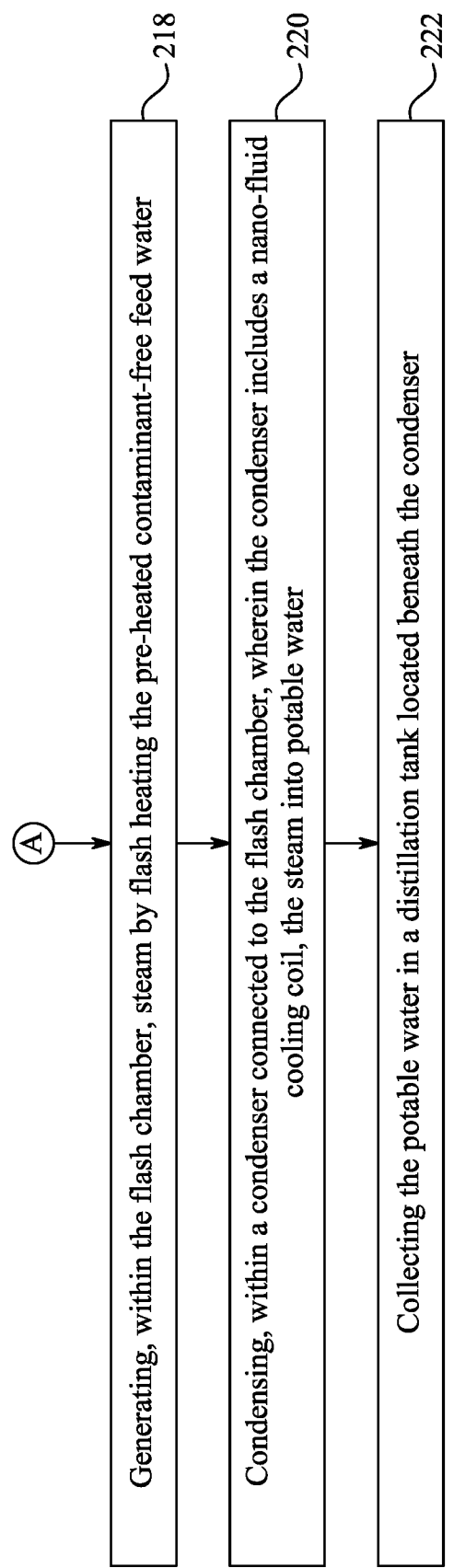

Referring now to FIG. 2, the present disclosure further provides a desalination method (as represented by a flowchart, referred by reference numeral 200). The desalination method 200 includes a series of steps. These steps are only illustrative, and other alternatives may be considered where one or more steps are added, one or more steps are removed, or one or more steps are provided in a different sequence without departing from the scope of the present disclosure. Various variants disclosed above, with respect to the aforementioned desalination system 100 apply mutatis mutandis to the present desalination method 200.

At step 202, the desalination method 200 includes removing contaminants from the feed water by pumping, by the feed pump 116 fluidly connected to the feed tank 112, the feed water through the plurality of thin-filmed photocatalyst coated glass tubes 120. The feed pump 116 ensures a consistent flow of feed water from the feed tank 112 into the thin-filmed photocatalyst coated glass tubes 120, where the photocatalyst coating activates a photocatalytic cleaning reaction when exposed to sunlight or ultraviolet light. As the feed water flows through the thin-filmed photocatalyst coated glass tubes 120, the photocatalytic cleaning reaction removes various contaminants, including organic compounds and traces of heavy metals, from the feed water. This pre-treatment stage ensures that the feed water is effectively purified before moving to subsequent stages of the desalination process.

At step 204, the desalination method 200 includes measuring, by the light sensor 106, an intensity of solar radiation falling upon the feed water heater 130. The light sensor 106 detects the solar radiation levels and provides data to the microprocessor 108 to assess light intensity. This information aids the microprocessor 108 to determine whether the solar radiation is sufficient to efficiently pre-heat the feed water passing through the feed water heater 130. By continuously monitoring the light intensity, the light sensor 106 helps to decide whether to rely on solar energy for direct heating of the feed water or switch to alternative heating sources or configurations. This measurement facilitates the desalination system 100 to optimize energy usage and adjust operational modes accordingly, ensuring that the renewable energy is used effectively for heating the feed water while maintaining consistent desalination.

Further, the desalination method 200 includes checking when the intensity of the solar radiation is equal to or above a threshold intensity. Herein, the threshold intensity refers to a predefined level of solar radiation required to directly heat the feed water using the feed water heater 130. The light sensor 106 measures the light intensity of solar radiation usable by the feed water heater 130, and when this light intensity meets or exceeds the threshold intensity, the desalination system 100 proceeds with solar heating. This ensures that the feed water is efficiently pre-heated using renewable solar energy. If the measured light intensity falls below the threshold intensity, indicating insufficient sunlight, the desalination system 100 can switch to an alternative mode of operation, such as using the geothermal energy based heat exchanger 140 or the thermal energy storage tank 142 for pre-heating the feed water.

In particular, when the intensity of the solar radiation is equal to or above the threshold intensity (as represented in block 205a), the desalination method 200 is executed in the first mode of the first flow control valve 102 connected to an outlet of the thin-filmed photocatalyst coated glass tubes 120. Herein, at the step 206, the desalination method 200 includes directing the contaminant-free feed water to the feed water heater 130. That is, the contaminant-free feed water is directed to the feed water heater 130 after it has been purified through the plurality of thin-filmed photocatalyst coated glass tubes 120. At step 208, the desalination method 200 includes pre-heating, by the feed water heater 130, the contaminant-free clean water. Once in the feed water heater 130, the contaminant-free clean water is pre-heated using solar energy or another heating source, ensuring that the water reaches the optimal temperature for the subsequent stages of the desalination process. At step 210, the desalination method 200 includes directing, by the second flow control valve 104, the first portion 'P1' of the pre-heated contaminant-free feed water into the thermal energy storage tank 142 and the second portion 'P2' of the pre-heated contaminant-free feed water into the flash chamber 144. This ensures that the pre-heated feed water is efficiently distributed between the thermal energy storage tank 142 and the flash chamber 144, optimizing energy usage and maintaining continuous desalination.

Conversely, when the intensity of the solar radiation is below the threshold intensity (as represented in block 205b), the desalination method 200 is executed in the second mode of the first flow control valve 102. Herein, at the step 212, the desalination method 200 includes directing the contaminant-free feed water through the geothermal energy based heat exchanger 140. The geothermal energy-based heat exchanger 140 uses the thermal energy of the earth to pre-heat the contaminant-free feed water. At step 214, the desalination method 200 includes pre-heating the contaminant-free feed water in the geothermal energy based heat exchanger 140. This pre-heating ensures that the feed water reaches a suitable temperature for efficient desalination. At step 216, the desalination method 200 includes directing the pre-heated contaminant-free feed water into the thermal energy storage tank 142, and injecting the pre-heated contaminant-free feed water into the flash chamber 144. The thermal energy storage tank 142 retains the pre-heated water until it is ready to be injected into the flash chamber 144, and thus helps maintain a steady supply of pre-heated water to the flash chamber 144, ensuring continuous operation. The pre-heated contaminant-free feed water is then injected into the flash chamber 144, where it rapidly vaporizes due to the pressure difference, creating steam that is subsequently condensed into potable water.

Further, at step 218, the desalination method 200 includes generating, within the flash chamber 144, steam by flash heating the pre-heated contaminant-free feed water. In flash heating, the pre-heated feed water is sprayed or introduced into the flash chamber 144, where the sudden drop in pressure causes it to boil instantly, converting a portion of the water into steam. At step 220, the desalination method 200 includes condensing, within the condenser 150 connected to the flash chamber 144, wherein the condenser 150 includes the nano-fluid cooling coil 152, the steam into potable water. The steam produced by flash heating in the flash chamber 144 enters the condenser 150, where it comes into contact with the nano-fluid cooling coil 152. The cooling coil 152 contains a nanofluid with high thermal conductivity that efficiently absorbs the heat from the steam, rapidly lowering its temperature. As the steam loses heat through contact with the nano-fluid cooling coil 152, it condenses into liquid form as potable water. At step 222, the desalination method 200 includes collecting the potable water in the distillate collection tank 154 located beneath the condenser 150. Once the steam has been effectively cooled and condensed into liquid form by the nano-fluid cooling coil 152, the potable water flows downward into the distillate collection tank 154 due to gravity. The distillate collection tank 154 stores the potable water, ensuring that it is ready for further use or distribution.

In an aspect of the present disclosure, the threshold intensity is about 5,000 lux. This means that when the light sensor 106 measures the solar radiation intensity being usable by the feed water heater 130, it needs to reach or exceed 5,000 lux to initiate direct solar heating. If the light intensity is below this level, the desalination system 100 switches to using the geothermal energy-based heat exchanger 140 or drawing pre-heated water from the thermal energy storage tank 142. This value of the threshold intensity ensures that the feed water heater 130 receives sufficient solar energy to efficiently pre-heat the feed water, ensuring consistent desalination while prioritizing renewable solar energy whenever possible.

The desalination method 200 further includes, when the intensity of the solar radiation is below the threshold intensity, illuminating, by the electric powered UV light source 122, the thin-filmed photocatalyst coated glass tubes 120. That is, when the intensity of solar radiation falls below the threshold intensity of approximately 5,000 lux, the thin-filmed photocatalyst coated glass tubes 120 are illuminated by the electric powered UV light source 122. The electric powered UV light source 122 provides consistent and reliable illumination (supplementing or replacing natural sunlight) to activate the photocatalyst coating on the glass tubes 120, facilitating the reaction to proceed. This ensures that the photocatalytic cleaning reaction continues to effectively remove contaminants from the feed water even during periods of insufficient sunlight or at night.

The desalination method 200 includes powering the feed pump 116 by the first PV panel 118 including the storage battery, powering the electric powered UV light source 122 by the second PV panel 124 including the storage battery, powering the nanofluid pump 160 by the third PV panel 162 including the storage battery, and powering the vacuum pump 166 by the fourth PV panel 168 including the storage battery. The desalination method 200 utilizes these multiple PV panels with corresponding storage batteries to power various components, ensuring a sustainable and renewable energy source for the desalination process. By powering these components with separate PV panels and respective storage batteries, the desalination method 200 ensures continuous operation of the processes of the desalination system 100 while maximizing the use of renewable solar energy.

The desalination method 200 also includes receiving, by the microprocessor 108 including electrical circuitry, the memory storing program instructions and the at least one processor, the light intensity measurements from the light sensor 106. By analyzing this data, the microprocessor 108 can assess whether the solar intensity is sufficient for efficient pre-heating of feed water. This information guides the decision-making process for switching between different modes of operation, such as using solar heating or activating the electric powered UV light source 122. The desalination method 200 further includes executing, by the processor, the program instructions to control the feed pump 116, the first flow control valve 102, the second flow control valve 104, the nanofluid pump 160, the vacuum pump 166, the switch 126 of the electric powered ultraviolet (UV) light source 122 and the heating element 146 located within the interior walls of the flash chamber 144 based on the light intensity measurements from the light sensor 106. By coordinating these components based on the light intensity data, the microprocessor 108 ensures that the desalination system 100 adapts to varying environmental conditions, maintaining an efficient desalination process.

The desalination method 200 further includes pre-heating the contaminant-free feed water in the geothermal energy based heat exchanger 140 by pumping the contaminant-free feed water through the plurality of connected pipes 141 buried within the underground layer 10 and exchanging the thermal energy with the underground layer 10. The temperature of the underground layer 10 provides a reliable heat source, raising the temperature of the contaminant-free feed water to a suitable level for further pre-heating or direct injection into the flash chamber 144. This pre-heating step minimizes the energy required for subsequent desalination stages, reducing operational costs and maintaining efficient performance.

Figure 3:
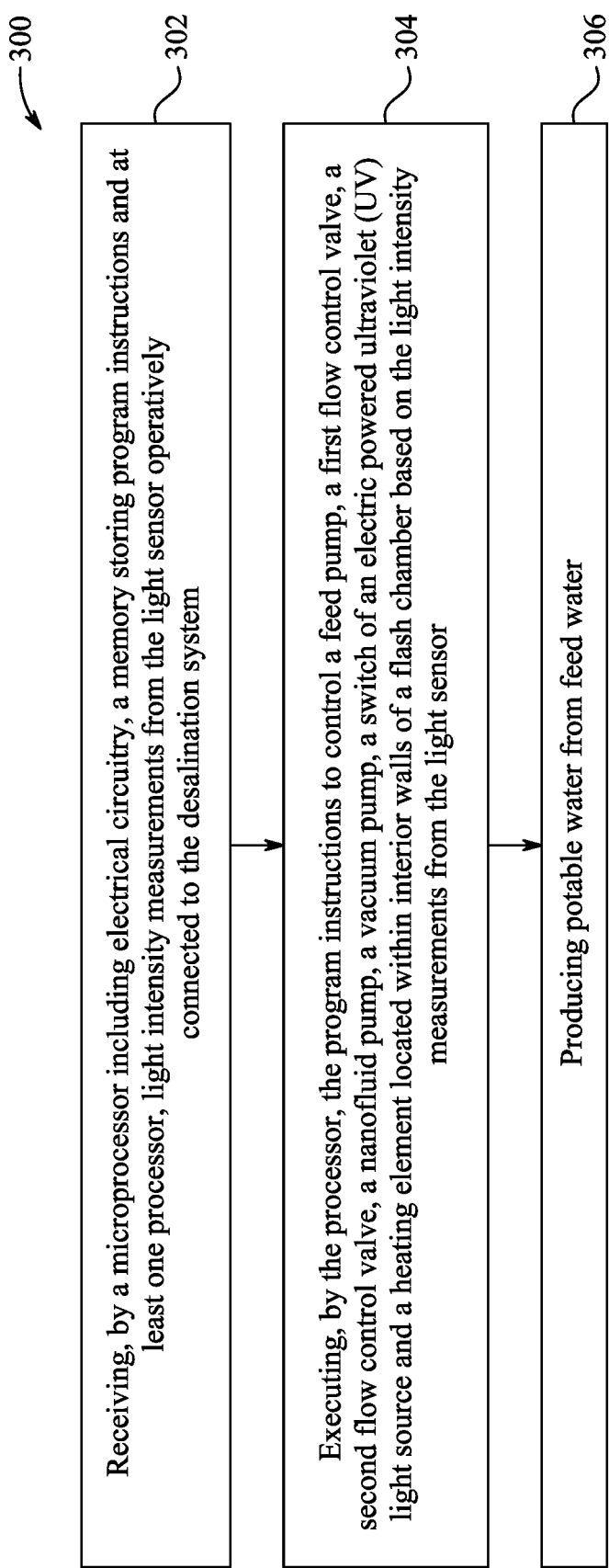
FIG. 3 is an exemplary flowchart of a method of controlling the desalination system, according to certain embodiments.

Referring now to FIG. 3, the present disclosure further provides a method (as represented by a flowchart, referred by reference numeral 300) of controlling the desalination system 100. The method 300 includes a series of steps. These steps are only illustrative, and other alternatives may be considered where one or more steps are added, one or more steps are removed, or one or more steps are provided in a different sequence without departing from the scope of the present disclosure. Various variants disclosed above, with respect to the aforementioned desalination system 100 and the desalination method 200 apply mutatis mutandis to the present method 300.

At step 302, the method 300 includes receiving, by the microprocessor 108 including electrical circuitry, the memory storing program instructions and the at least one processor, light intensity measurements from the light sensor 106 operatively connected to the desalination system 100. The light sensor 106 continuously monitors the level of solar radiation available and provides real-time data to the microprocessor 108. This information aids the microprocessor 108 to accurately determine whether the solar radiation is sufficient to power solar heating and photocatalysis or if alternative modes of operation, such as using the geothermal energy based heat exchanger 140 or activating the electric powered UV light source 122, are required to for efficient desalination operation.

At step 304, the method 300 includes executing, by the processor, the program instructions to control the feed pump 116, the first flow control valve 102, the second flow control valve 104, the nanofluid pump 160, the vacuum pump 166, the switch 126 of an electric powered ultraviolet (UV) light source 122 and the heating element 146 located within the interior walls of the flash chamber 144 based on the light intensity measurements from the light sensor 106. The microprocessor 108 adjusts the feed pump 116 to maintain the appropriate flow rate and pressure of feed water through the desalination system 100. The first flow control valve 102 and the second flow control valve 104 are regulated to direct the feed water to the desired pre-heating sources or the flash chamber 144. The nanofluid pump 160 and the vacuum pump 166 are controlled to ensure optimal condensation of steam in the condenser 150. The switch 126 of the electric powered UV light source 122 is activated to illuminate the thin-filmed photocatalyst coated glass tubes 120 when sunlight is insufficient. The heating element 146 is used to maintain the correct temperature for efficient flash heating.

At step 306, the method 300 includes producing potable water from the feed water. That is, after passing through pre-treatment stages such as photocatalysis or geothermal pre-heating, the feed water enters the flash chamber 144, where it is rapidly converted into steam. This steam is condensed in the condenser 150 into the potable water through the use of the nano-fluid cooling coil 152. The potable water is then collected in the distillate collection tank 154, ensuring a supply of clean water ready for consumption or further use.

The method 300 further includes removing contaminants from the feed water by pumping, by the feed pump 116 fluidly connected to the feed tank 112, the feed water through the plurality of thin-filmed photocatalyst coated glass tubes 120. The method 300 also includes measuring, by the light sensor 106, the intensity of solar radiation falling upon the desalination system 100. When the intensity of the solar radiation is equal to or above the threshold intensity, in the first mode of the first flow control valve 102 connected to the outlet of the thin-filmed photocatalyst coated glass tubes 120, the method 300 includes directing the contaminant-free feed water to the feed water heater 130. The method 300 further includes pre-heating, by the feed water heater 130, the contaminant-free clean water. The method 300 further includes directing, by the second flow control valve 104, the first portion 'P1' of the pre-heated contaminant-free feed water into the thermal energy storage tank 142 and the second portion 'P2' of the pre-heated contaminant-free feed water into the flash chamber 144. When the intensity of the solar radiation is below the threshold intensity, in the second mode of the first flow control valve 102, the method 300 includes directing the contaminant-free feed water through the geothermal energy based heat exchanger 140. The method 300 also includes pre-heating the contaminant-free feed water in the geothermal energy based heat exchanger 140. The method 300 also includes directing the pre-heated contaminant-free feed water into the thermal energy storage tank 142, and injecting the pre-heated contaminant-free feed water into the flash chamber 144. The method 300 further includes generating, within the flash chamber 144, steam by flash heating the pre-heated contaminant-free feed water. The method 300 further includes condensing, within the condenser 150 connected to the flash chamber 144, wherein the condenser 150 includes the nano-fluid cooling coil 152, the steam into potable water. The method 300 further includes collecting the potable water in the distillation tank distillate collection tank 154 located beneath the condenser 150.

The present disclosure provides the desalination system 100, the desalination method 200, and the method 300 of controlling the desalination system 100. The desalination system 100 is a concentrated solar powered flash desalination system which incorporates pre-treatment of feed water by photocatalysis. The desalination system 100 is capable of day and night operation and is fully sustainable. The major components of the desalination system 100 include the plurality of thin-filmed photocatalyst coated glass tubes 120, the geothermal energy based heat exchanger 140, the feed water heater 130 with the affixed absorber plate 132, the solar energy concentrator 134, the flow control valves 102 104, the thermal energy storage tank 142, the flash chamber 144 and the nano-fluid based condenser 150. The desalination system 100 provides pretreatment of feed water in the plurality of thin-filmed photocatalyst coated glass tubes 120, storage of thermal energy for night operation by the geothermal energy based heat exchanger 140 and phase change materials or molten salt in the thermal energy storage tank 142, and usage of nano-fluids in the nano-fluid based condenser 150.

The plurality of thin-filmed photocatalyst coated glass tubes 120 assist in removal of traces of organic and inorganic compounds, as well as the removal of heavy metals present in the feed water. The solar energy concentrator 134 assists in concentrating the solar energy onto the absorber plate 132. The absorber plate 132 assists in rapid heating of the feed water. The flow control valves 102 104 assist in controlling the flow direction for day and night operations. The desalination system 100 includes the external cold nano-fluid based condenser 150. The nano-fluid may be of any highly conducting material, or it may also be a hybrid nano-fluid. All the pumps of the desalination system 100 are powered by photovoltaic (PV) panels which have sufficient battery backup for night operations. The microprocessor 108 controls the activity of the feed pump 116, the vacuum pump 166 and the nano-fluid pump 160 based on the distillate production required. The microprocessor 108 further controls the flow control valves 102, 104 to direct the fluid flow for day and night operations separately.

For day time operations of the desalination system 100, the process begins by supply of the feed water into the plurality of thin-filmed photocatalyst coated glass tubes 120 which are exposed to direct sunlight. The removal of traces of organic and inorganic compounds takes place in the plurality of thin-filmed photocatalyst coated glass tubes 120. The pre-treated water then moves into the feed water heater 130 via the first flow control valve 102. Inside the feed water heater 130, there is significant heat gained by the feed water due to concentrated solar radiation being transmitted to the feed water via the absorber plate 132. The heated feed water then moves via the second flow control valve 104 into the thermal energy storage tank 142. Once there is sufficient energy storage in the thermal energy storage tank 142, the second flow control valve 104 shuts the water supply into the thermal energy storage tank 142 and directs the feed water directly into the flash chamber 144, bypassing the thermal energy storage tank 142. Flashing occurs in the flash chamber 144 and the generated vapors move into the condenser 150 by means of a pressure differential created by a vacuuming effect inside the condenser 150. The vapors entering the condenser 150 are cooled by means of the external cold nano-fluid. The condensed vapors are collected in the distillate collection tank 154 as a distillate output. The brine accumulated inside the flash chamber 144 is collected beneath in the brine collection tank 148.

For night-time operation of the desalination system 100, the photocatalytic activity is achieved by means of the electric powered UV light source 122. The first flow control valve 102 then directs the pre-treated water into the geothermal energy based heat exchanger 140. Inside the geothermal energy based heat exchanger 140, pre-heating of the feed water takes place by means of geothermal energy. The pre-heated water is then sent into the thermal energy storage tank 142 for further heat gain, after which it is sent into the flash chamber 144. Flashing occurs in the flash chamber 144 and the generated vapors move to the condenser 150 again by means of a pressure differential created between the flash chamber 144 and the condenser 150. The condensed vapors are then collected in the distillate collection tank 154. The desalination system 100 can run all year round continuously during the day and night, employs renewable energy sources and is fully sustainable.

The desalination system 100 provides a significant advancement in the field of desalination technology by integrating various components and features. The desalination system 100 incorporates the plurality of thin-filmed photocatalyst coated glass tubes 120, which facilitate the removal of contaminants, including traces of organic and inorganic compounds as well as heavy metals, from the feed water through a photocatalytic cleaning reaction. This pretreatment step enhances the quality of the feed water before it enters the subsequent desalination processes, ensuring a more efficient and effective overall system. Furthermore, the desalination system 100 incorporates advanced control and automation features through the integration of the light sensor 106 and the microprocessor 108. This control scheme facilitates optimized operation under varying environmental conditions, reducing energy consumption and maximizing the production of potable water.

The desalination system 100 offers distinct advantages over existing desalination systems. The desalination system 100 has the ability to operate continuously, day and night, through the integration of the solar-powered components, such as the solar energy concentrator 134, the absorber plate 132, and the feed water heater 130, as well as the geothermal energy based heat exchanger 140 and the thermal energy storage tank 142. This combination facilitates the desalination system 100 to harness solar energy during the day and store thermal energy for use during nighttime operations, ensuring an uninterrupted supply of potable water. Additionally, the use of nano-fluids in the nano-fluid based condenser 150 enhances heat transfer efficiency, providing a more compact and energy-efficient design compared to traditional condensers.

A first embodiment describes a desalination system 100, comprising a feed tank 112 fluidly connected to a feed water supply 110, a feed pump 116 fluidly connected to the feed tank 112, a plurality of thin-filmed photocatalyst coated glass tubes 120 fluidly connected to the feed pump 116, wherein the feed pump 116 is configured to pump feed water from the feed tank 112 through the plurality of thin-filmed photocatalyst coated glass tubes 120, wherein the plurality of thin-filmed photocatalyst coated glass tubes 120 are configured to perform a photocatalytic cleaning reaction which removes contaminants from the feed water, a first flow control valve 102 connected to the plurality of photocatalyst coated glass tubes 120, wherein the first flow control valve 102 has a first mode in which the contaminant-free feed water is fluidly directed towards a feed water heater 130 which is configured to pre-heat the contaminant-free clean water and a second mode in which the contaminant-free feed water is fluidly directed into a geothermal energy based heat exchanger 140, a second flow control valve 104 configured to fluidly direct a first portion 'P1' of the pre-heated contaminant-free feed water into a thermal energy storage tank 142 and a second portion 'P2' of the pre-heated contaminant-free feed water into a flash chamber 144, wherein the flash chamber 144 is configured to generate steam by flash heating the pre-heated contaminant-free feed water, a condenser 150 connected to the flash chamber 144, wherein the condenser 150 includes a nano-fluid cooling coil 152, wherein the condenser 150 is configured to condense the steam into potable water, and a distillate collection tank 154 located beneath the condenser 150, wherein the distillate collection tank 154 is configured to collect potable water.

In an aspect, the desalination system 100 includes a nanofluid pump 160 fluidly connected to a first end 152*a* of the nano-fluid cooling coil 152, a cold nanofluid tank 164 fluidly connected between a second end 152*b* of the nanofluid cooling coil 152 and the nanofluid pump 160, wherein the nanofluid pump 160 is configured to pump a cold nanofluid from the cold nanofluid tank 164 through the nano-fluid cooling coil 152 to condense the steam into potable water.

In an aspect, the desalination system 100 includes a vacuum pump 166 connected to the condenser 150, wherein the vacuum pump 166 is configured to remove excess air from the condenser 150.

In an aspect, the desalination system 100 includes an electric powered ultraviolet (UV) light source 122 configured to illuminate the thin-filmed photocatalyst coated glass tubes 120 during hours of the day and the night when there is insufficient sunlight to generate the photocatalytic cleaning reaction.

In an aspect, the desalination system 100 includes a geothermal energy pre-heating loop 101, wherein the contaminant-free water is passed, during the second mode of operation of the first flow control valve 102, through the geothermal energy based heat exchanger 140, wherein the geothermal energy based heat exchanger 140 is configured to pre-heat the contaminant-free feed water by thermal energy exchange with an underground layer 10, wherein the feed pump 116 is configured to pump the pre-heated contaminant-free feed water to the thermal energy storage tank 142, wherein the thermal energy storage tank 142 is configured to release the pre-heated contaminant-free water to the flash chamber 144.

In an aspect, the desalination system 100 includes a first photovoltaic (PV) panel 118 including a storage battery operatively connected to the feed pump 116, a second photovoltaic (PV) panel 124 including a storage battery operatively connected to the electric powered UV light source 122, a third photovoltaic (PV) panel 162 including a storage battery operatively connected to the nanofluid pump 160, and a fourth photovoltaic (PV) panel 168 including a storage battery operatively connected to the vacuum pump 166.

In an aspect, the desalination system 100 includes the flash chamber 144 which includes an inlet port 144*a* configured with a plurality of spray nozzles 145, a heating element 146 located within interior walls of the flash chamber 144, a steam outlet port 144*b* and a brine outlet port 144*c*, wherein the inlet port 144*a* is connected to second flow control valve 104 and to the thermal energy storage tank 142, the steam outlet port 144*b* is connected to the condenser 150 and the brine outlet port 144*c* is connected to a brine collection tank 148.

In an aspect, the desalination system 100 includes a light sensor 106 connected to the geothermal energy based heat exchanger 140, and a microprocessor 108 including electrical circuitry, a memory storing program instructions and at least one processor, wherein the microprocessor 108 is operatively connected to the feed pump 116, the first flow control valve 102, the second flow control valve 104, the nanofluid pump 160, the vacuum pump 166, a switch 126 of the electric powered ultraviolet (UV) light source 122 and the heating element 146 located within the interior walls of the flash chamber 144, wherein the microprocessor 108 is operatively connected to receive data signals from the light sensor 106, wherein the processor is configured to execute the program instructions to control the feed pump 116, the first flow control valve 102, the second flow control valve 104, the nanofluid pump 160, the vacuum pump 166, the switch 126 of the electric powered ultraviolet (UV) light source 122 and the heating element 146 located within the interior walls of the flash chamber 144 based on the data signals from the light sensor 106.

In an aspect, the desalination system 100 includes an absorber plate 132 connected to the feed water heater 130, and a solar energy concentrator 134 configured to direct sunlight towards the absorber plate 132 during the first mode.

In an aspect, the desalination system 100 includes the photocatalyst which is titanium dioxide.

In an aspect, the desalination system 100 includes a brine collection tank 148 located beneath the flash chamber 144, wherein the brine collection tank 148 is configured to store a brine water by-product released by the pre-heated contaminant-free feed water during conversion to steam.

In an aspect, the desalination system 100 includes the geothermal energy based heat exchanger 140 which comprises a plurality of connected pipes 141 buried within the underground layer 10, wherein the plurality of connected pipes 141 exchange the thermal energy with the underground layer 10.

A second embodiment describes a desalination method, comprising removing contaminants from a feed water by pumping, by a feed pump 116 fluidly connected to a feed tank 112, the feed water through a plurality of thin-filmed photocatalyst coated glass tubes 120, measuring, by a light sensor 106, an intensity of solar radiation falling upon a feed water heater 130, when the intensity of the solar radiation is equal to or above a threshold intensity, in a first mode of a first flow control valve 102 connected to an outlet of the thin-filmed photocatalyst coated glass tubes 120, directing the contaminant-free feed water to the feed water heater 130, pre-heating, by the feed water heater 130, the contaminant-free clean water, directing, by a second flow control valve 104, a first portion 'P1' of the pre-heated contaminant-free feed water into a thermal energy storage tank 142 and a second portion 'P2' of the pre-heated contaminant-free feed water into a flash chamber 144, when the intensity of the solar radiation is below the threshold intensity, in a second mode of the first flow control valve 102, directing the contaminant-free feed water through a geothermal energy based heat exchanger 140, pre-heating the contaminant-free feed water in the geothermal energy based heat exchanger 140, directing the pre-heated contaminant-free feed water into the thermal energy storage tank 142, and injecting the pre-heated contaminant-free feed water into the flash chamber 144, generating, within the flash chamber 144, steam by flash heating the pre-heated contaminant-free feed water, condensing, within a condenser 150 connected to the flash chamber 144, wherein the condenser 150 includes a nanofluid cooling coil 152, the steam into potable water, and collecting the potable water in a distillate collection tank 154 located beneath the condenser 150.

In an aspect, the desalination method includes the threshold intensity which is about 5,000 lux.

In an aspect, the desalination method includes, when the intensity of the solar radiation is below the threshold intensity, illuminating, by an electric powered ultraviolet (UV) light source 122, the thin-filmed photocatalyst coated glass tubes 120.

In an aspect, the desalination method includes powering the feed pump 116 by a first photovoltaic (PV) panel 118 including a storage battery, powering the electric powered UV light source 122 by a second photovoltaic (PV) panel 124 including a storage battery, powering the nanofluid pump 160 by a third photovoltaic (PV) panel 162 including a storage battery, and powering the vacuum pump 166 by a fourth photovoltaic (PV) panel 168 including a storage battery.

In an aspect, the desalination method includes receiving, by a microprocessor 108 including electrical circuitry, a memory storing program instructions and at least one processor, light intensity measurements from the light sensor 106, executing, by the processor, the program instructions to control the feed pump 116, the first flow control valve 102, the second flow control valve 104, the nanofluid pump 160, the vacuum pump 166, the switch 126 of the electric powered ultraviolet (UV) light source 122 and the heating element 146 located within the interior walls of the flash chamber 144 based on the light intensity measurements from the light sensor 106.

In an aspect, the desalination method includes pre-heating the contaminant-free feed water in the geothermal energy based heat exchanger 140 by pumping the contaminant-free feed water through a plurality of connected pipes 141 buried within an underground layer 10 and exchanging the thermal energy with the underground layer 10.

A third embodiment describes a method of controlling a desalination system 100, comprising receiving, by a microprocessor 108 including electrical circuitry, a memory storing program instructions and at least one processor, light intensity measurements from the light sensor 106 operatively connected to the desalination system 100, executing, by the processor, the program instructions to control a feed pump 116, a first flow control valve 102, a second flow control valve 104, a nanofluid pump 160, a vacuum pump 166, a switch 126 of an electric powered ultraviolet (UV) light source 122 and a heating element 146 located within interior walls of a flash chamber 144 based on the light intensity measurements from the light sensor 106, and producing potable water from feed water.

In an aspect, the method includes producing potable water from feed water which further comprises removing contaminants from the feed water by pumping, by a feed pump 116 fluidly connected to a feed tank 112, the feed water through a plurality of thin-filmed photocatalyst coated glass tubes 120, measuring, by the light sensor 106, an intensity of solar radiation falling upon the desalination system 100, when the intensity of the solar radiation is equal to or above a threshold intensity, in a first mode of a first flow control valve 102 connected to an outlet of the thin-filmed photocatalyst coated glass tubes 120, directing the contaminant-free feed water to the feed water heater 130, pre-heating, by the feed water heater 130, the contaminant-free clean water, directing, by a second flow control valve 104, a first portion 'P1' of the pre-heated contaminant-free feed water into a thermal energy storage tank 142 and a second portion 'P2' of the pre-heated contaminant-free feed water into a flash chamber 144, when the intensity of the solar radiation is below the threshold intensity, in a second mode of the first flow control valve 102, directing the contaminant-free feed water through a geothermal energy based heat exchanger 140, pre-heating the contaminant-free feed water in the geothermal energy based heat exchanger 140, directing the pre-heated contaminant-free feed water into the thermal energy storage tank 142, and injecting the pre-heated contaminant-free feed water into the flash chamber 144, generating, within the flash chamber 144, steam by flash heating the pre-heated contaminant-free feed water, condensing, within a condenser 150 connected to the flash chamber 144, wherein the condenser 150 includes a nano-fluid cooling coil 152, the steam into potable water, and collecting the potable water in a distillate collection tank 154 located beneath the condenser 150.

Figure 4:
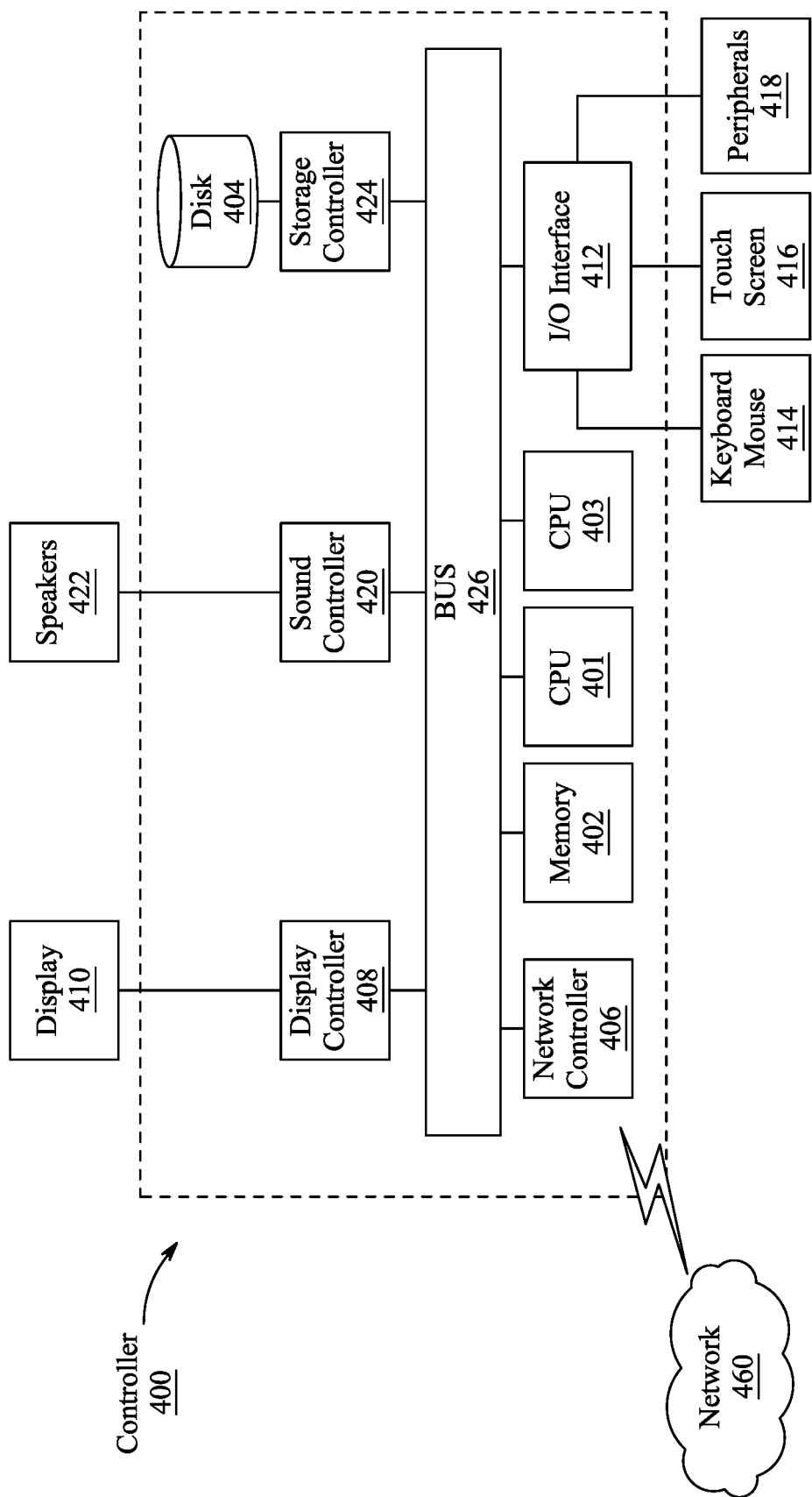
FIG. 4 is an illustration of a non-limiting example of details of computing hardware used in the computing system, according to certain embodiments.

Next, further details of the hardware description of the computing environment according to exemplary embodiments is described with reference to FIG. 4. In FIG. 4, a controller 400 is described which embodies the microprocessor 108. The controller 400 is a computing device which includes a CPU 401 which performs the processes described above/below. The process data and instructions may be stored in memory 402. These processes and instructions may also be stored on a storage medium disk 404 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 401, 403 and an operating system such as Microsoft Windows 7, Microsoft Windows 8, Microsoft Windows 10, UNIX, Solaris, LINUX, Apple MAC-OS, and other systems known to those skilled in the art.

The hardware elements in order to achieve the computing device may be realized by various circuitry elements, known to those skilled in the art. For example, CPU 401 or CPU 403 may be a Xenon or Core processor from Intel of America or an Opteron processor from AMD of America, or may be other processor types that would be recognized by one of ordinary skill in the art. Alternatively, the CPU 401, 403 may be implemented on an FPGA, ASIC, PLD or using discrete logic circuits, as one of ordinary skill in the art would recognize. Further, CPU 401, 403 may be implemented as multiple processors cooperatively working in parallel to perform the instructions of the inventive processes described above.

The computing device in FIG. 4 also includes a network controller 406, such as an Intel Ethernet PRO network interface card from Intel Corporation of America, for interfacing with network 460. As can be appreciated, the network 460 can be a public network, such as the Internet, or a private network such as an LAN or WAN network, or any combination thereof and can also include PSTN or ISDN subnetworks. The network 460 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 408, such as a NVIDIA GeForce GTX or Quadro graphics adaptor from NVIDIA Corporation of America for interfacing with display 410, such as a Hewlett Packard HPL2445w LCD monitor. A general purpose I/O interface 412 interfaces with a keyboard and/or mouse 414 as well as a touch screen panel 416 on or separate from display 410. General purpose I/O interface also connects to a variety of peripherals 418 including printers and scanners, such as an OfficeJet or DeskJet from Hewlett Packard.

A sound controller 420 is also provided in the computing device such as Sound Blaster X-Fi Titanium from Creative, to interface with speakers/microphone 422 thereby providing sounds and/or music.

The general purpose storage controller 424 connects the storage medium disk 404 with communication bus 426, which may be an ISA, EISA, VESA, PCI, or similar, for interconnecting all of the components of the computing device. A description of the general features and functionality of the display 410, keyboard and/or mouse 414, as well as the display controller 408, storage controller 424, network controller 406, sound controller 420, and general purpose I/O interface 412 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 5.

Figure 5:
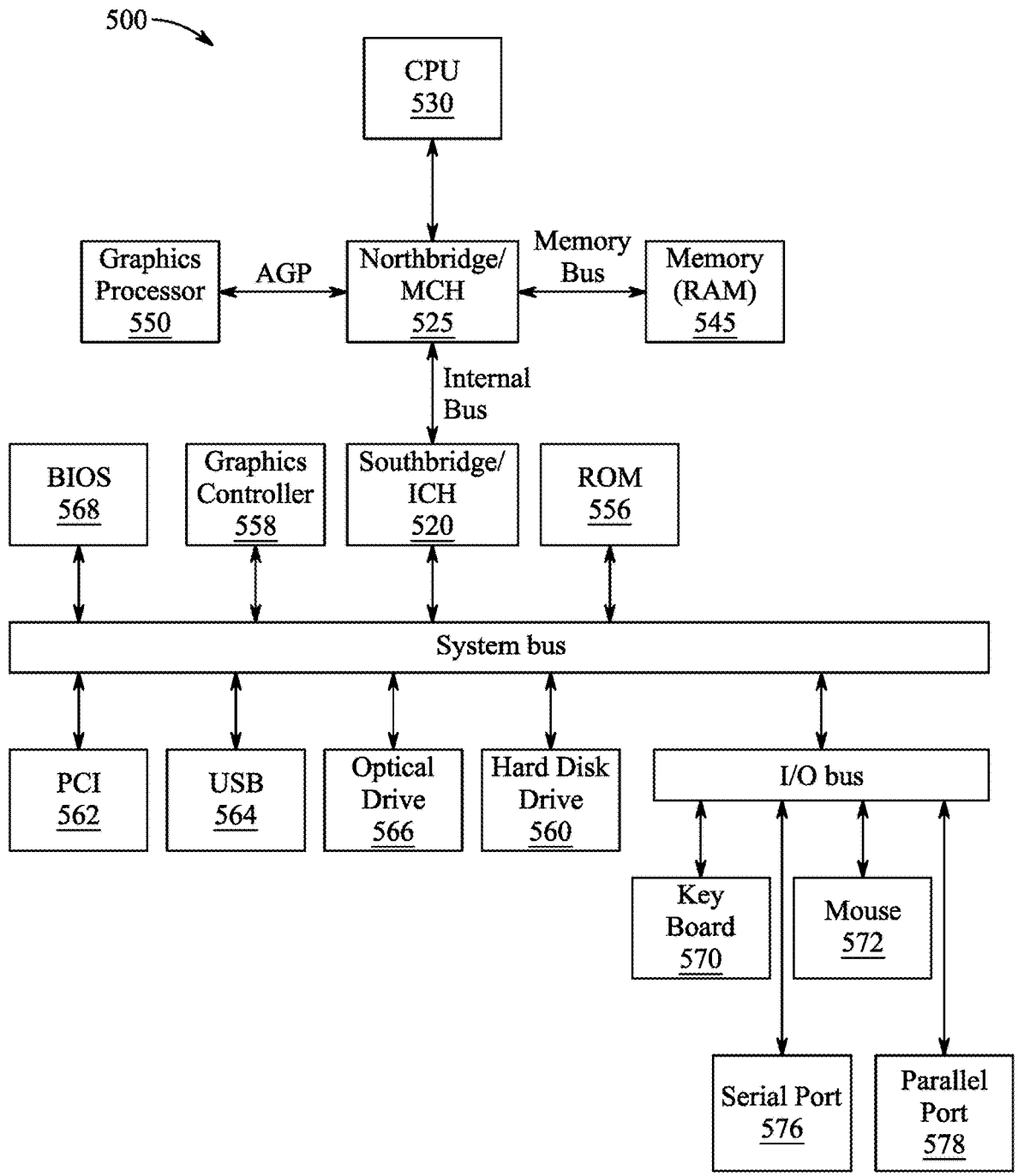
FIG. 5 is an exemplary schematic diagram of a data processing system used within the computing system, according to certain embodiments.

FIG. 5 shows a schematic diagram of a data processing system, according to certain embodiments, for performing the functions of the exemplary embodiments. The data processing system is an example of a computer in which code or instructions implementing the processes of the illustrative embodiments may be located.

In FIG. 5, data processing system 500 employs a hub architecture including a north bridge and memory controller hub (NB/MCH) 525 and a south bridge and input/output (I/O) controller hub (SB/ICH) 520. The central processing unit (CPU) 530 is connected to NB/MCH 525. The NB/MCH 525 also connects to the memory 545 via a memory bus, and connects to the graphics processor 550 via an accelerated graphics port (AGP). The NB/MCH 525 also connects to the SB/ICH 520 via an internal bus (e.g., a unified media interface or a direct media interface). The CPU Processing unit 530 may contain one or more processors and even may be implemented using one or more heterogeneous processor systems.

Figure 6:
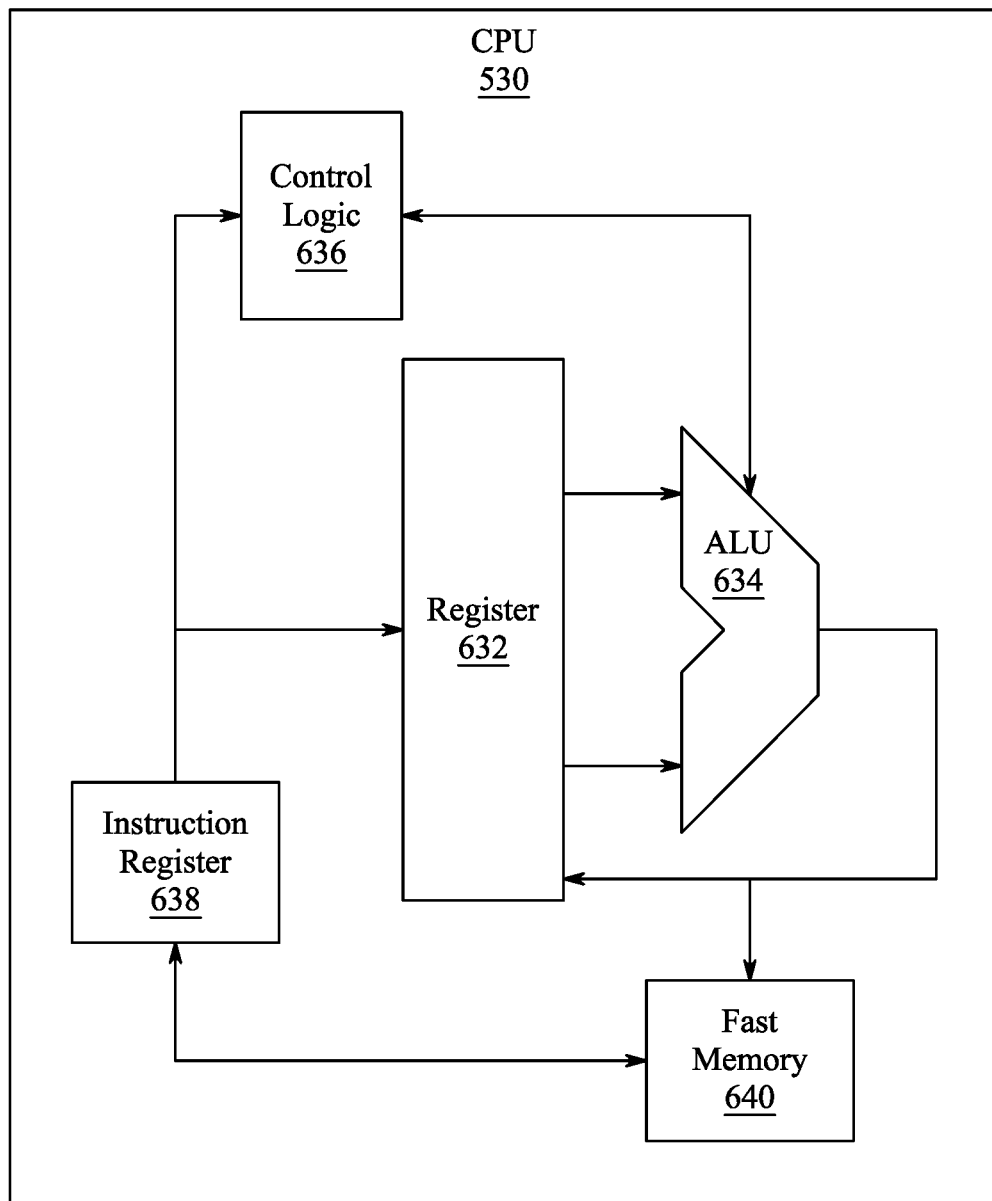
FIG. 6 is an exemplary schematic diagram of a processor used with the computing system, according to certain embodiments.

For example, FIG. 6 shows one implementation of CPU 530. In one implementation, the instruction register 638 retrieves instructions from the fast memory 640. At least part of these instructions are fetched from the instruction register 638 by the control logic 636 and interpreted according to the instruction set architecture of the CPU 530. Part of the instructions can also be directed to the register 632. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 634 that loads values from the register 632 and performs logical and mathematical operations on the loaded values according to the instructions. The results from these operations can be feedback into the register and/or stored in the fast memory 640. According to certain implementations, the instruction set architecture of the CPU 530 can use a reduced instruction set architecture, a complex instruction set architecture, a vector processor architecture, a very large instruction word architecture. Furthermore, the CPU 530 can be based on the Von Neuman model or the Harvard model. The CPU 530 can be a digital signal processor, an FPGA, an ASIC, a PLA, a PLD, or a CPLD. Further, the CPU 530 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 5, the data processing system 500 can include that the SB/ICH 520 is coupled through a system bus to an I/O Bus, a read only memory (ROM) 556, universal serial bus (USB) port 564, a flash binary input/output system (BIOS) 568, and a graphics controller 558. PCI/PCIe devices can also be coupled to SB/ICH 588 through a PCI bus 562.

The PCI devices may include, for example, Ethernet adapters, add-in cards, and PC cards for notebook computers. The Hard disk drive 560 and CD-ROM 566 can use, for example, an integrated drive electronics (IDE) or serial advanced technology attachment (SATA) interface. In one implementation the I/O bus can include a super I/O (SIO) device.

Further, the hard disk drive (HDD) 560 and optical drive 566 can also be coupled to the SB/ICH 520 through a system bus. In one implementation, a keyboard 570, a mouse 572, a parallel port 578, and a serial port 576 can be connected to the system bus through the I/O bus. Other peripherals and devices that can be connected to the SB/ICH 520 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 7:
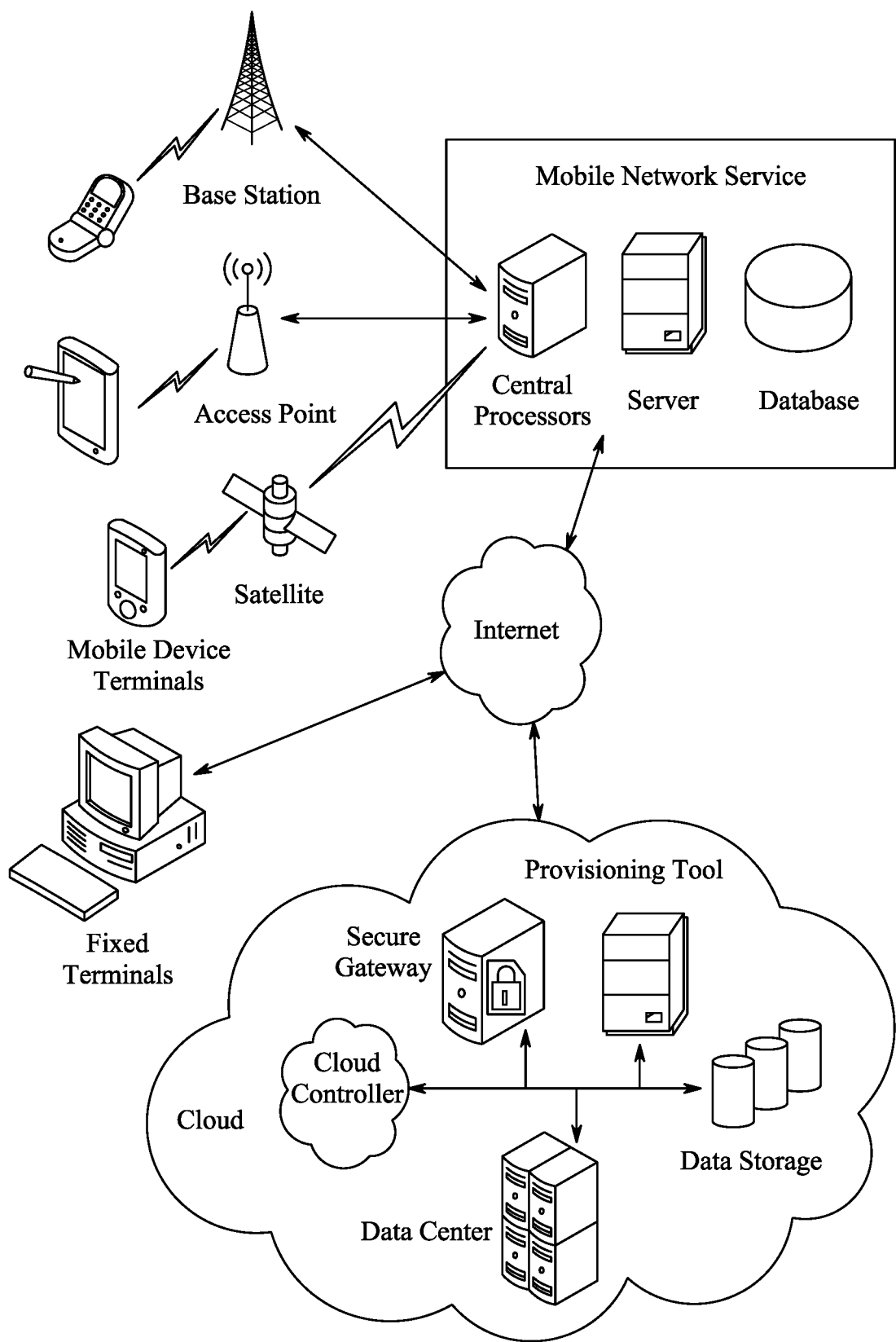
FIG. 7 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 7, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:
1. A desalination method, comprising:
removing contaminants from a feed water by pumping, by a feed pump fluidly connected to a feed tank, the feed water through a plurality of thin-filmed photocatalyst coated glass tubes;
measuring, by a light sensor, an intensity of solar radiation falling upon a feed water heater;
when the intensity of the solar radiation is equal to or above a threshold intensity,
in a first mode of a first flow control valve connected to an outlet of the thin-filmed photocatalyst coated glass tubes,
directing the contaminant-free feed water to the feed water heater;
pre-heating, by the feed water heater, the contaminant-free clean water;
directing, by a second flow control valve, a first portion of the pre-heated contaminant-free feed water into a thermal energy storage tank and a second portion of the pre-heated contaminant-free feed water into a flash chamber,
when the intensity of the solar radiation is below the threshold intensity,
in a second mode of the first flow control valve,
directing the contaminant-free feed water through a geothermal energy based heat exchanger,
pre-heating the contaminant-free feed water in the geothermal energy based heat exchanger,
directing the pre-heated contaminant-free feed water into the thermal energy storage tank, and injecting the pre-heated contaminant-free feed water into the flash chamber;
generating, within the flash chamber, steam by flash heating the pre-heated contaminant-free feed water;
condensing, within a condenser connected to the flash chamber, wherein the condenser includes a nano-fluid cooling coil, the steam into potable water; and
collecting the potable water in a distillate collection tank located beneath the condenser,
wherein the thin-filmed photocatalyst coated glass tubes comprise a photocatalyst thin film present as substantially equal-area continuous quarter sections extending along the length of the glass tubes with four quarter sections equally spaced on the interior of the glass tubes, and
wherein the photocatalyst thin film comprises a titanium dioxide thin film onto which copper metal islands are dispersed, wherein the copper metal islands are in the form of metal particulates projecting from the surface of the titanium dioxide thin film, and wherein the copper metal islands are present in a weight ratio to the titanium dioxide of from 0.01 to 1:10 to 1000.

2. The desalination method of claim 1, wherein the threshold intensity is about 5,000 lux.

3. The desalination method of claim 1, further comprising:
when the intensity of the solar radiation is below the threshold intensity, illuminating, by an electric powered ultraviolet (UV) light source, the thin-filmed photocatalyst coated glass tubes.

4. The desalination method of claim 1, further comprising:
powering the feed pump by a first photovoltaic (PV) panel including a storage battery;
powering an electric powered UV light source by a second photovoltaic (PV) panel including a storage battery;
powering the nanofluid pump by a third photovoltaic (PV) panel including a storage battery; and
powering the vacuum pump by a fourth photovoltaic (PV) panel including a storage battery.

5. The desalination method of claim 1, further comprising:
receiving, by a microprocessor including electrical circuitry, a memory storing program instructions and at least one processor, light intensity measurements from the light sensor;

executing, by the processor, the program instructions to control the feed pump, the first flow control valve, the second flow control valve, the nanofluid pump, the vacuum pump, a switch of an electric powered ultraviolet (UV) light source and a heating element located within interior walls of the flash chamber based on the light intensity measurements from the light sensor.

6. The desalination method of claim 1, further comprising:
pre-heating the contaminant-free feed water in the geothermal energy based heat exchanger by pumping the contaminant-free feed water through a plurality of connected pipes buried within an underground layer and exchanging the thermal energy with the underground layer.

7. The method of claim 3, wherein the electric powered UV light source is an extended tube-like fixture present proximal to or on the exterior of the thin-filmed photocatalyst coated glass tubes having a length substantially the same as the length of the thin-filmed photocatalyst coated glass tubes.

8. The method of claim 1, wherein the flash chamber comprises an inlet port connected to the second flow control valve and the thermal energy storage tank, wherein the inlet port is configured with a plurality of spray nozzles, wherein the spray nozzles are configured to introduce the pre-heated contaminant-free feed water into the flash chamber in the form of fine droplets or a spray pattern.

9. The method of claim 1, wherein the plurality of thin-filmed photocatalyst coated glass tubes are configured to catalyze a photocatalytic cleaning reaction which removes contaminants from the feed water;
wherein the first flow control valve has a first mode in which the contaminant-free feed water is fluidly directed towards the feed water heater which is configured to pre-heat the contaminant-free clean water and a second mode in which the contaminant-free feed water is fluidly directed into the geothermal energy based heat exchanger;
wherein the second flow control valve is configured to fluidly direct a first portion of the pre-heated contaminant-free feed water into the thermal energy storage tank and a second portion of the pre-heated contaminant-free feed water into the flash chamber, wherein the flash chamber is configured to generate steam by flash heating the pre-heated contaminant-free feed water.

10. The method of claim 1, wherein
a nanofluid pump is fluidly connected to a first end of the nano-fluid cooling coil, and
wherein a cold nanofluid tank is fluidly connected between a second end of the nano-fluid cooling coil and the nanofluid pump, wherein the nanofluid pump is configured to pump a cold nanofluid from the cold nanofluid tank through the nano-fluid cooling coil to condense the steam into potable water.

11. The method of claim 10, wherein the cold nanofluid comprises a nanofluid comprising nanoparticles selected from the group consisting of zinc oxide, aluminum oxide, titanium dioxide, and boron nitride.

12. The method of claim 10, wherein
a vacuum pump is connected to the condenser, wherein the vacuum pump is configured to remove excess air from the condenser.

13. The method of claim 12, wherein
an electric powered ultraviolet (UV) light source is configured to illuminate the thin-filmed photocatalyst coated glass tubes during hours of the day and the night when there is insufficient sunlight to generate the photocatalytic cleaning reaction.

14. The method of claim 13,
wherein the contaminant-free water is passed, during the second mode of operation of the first flow control valve, through a geothermal energy based heat exchanger, wherein the geothermal energy based heat exchanger is configured to pre-heat the contaminant-free feed water by thermal energy exchange with an underground layer,
wherein the feed pump is configured to pump the pre-heated contaminant-free feed water to the thermal energy storage tank,
wherein the thermal energy storage tank is configured to release the pre-heated contaminant-free water to the flash chamber.

15. The method of claim 14, wherein
a first photovoltaic (PV) panel including a storage battery is operatively connected to the feed pump,
wherein a second photovoltaic (PV) panel including a storage battery is operatively connected to the electric powered UV light source,
wherein a third photovoltaic (PV) panel including a storage battery is operatively connected to the nanofluid pump, and
wherein a fourth photovoltaic (PV) panel including a storage battery is operatively connected to the vacuum pump.

16. The method of claim 15, wherein the flash chamber includes an inlet port configured with a plurality of spray nozzles, a heating element located within interior walls of the flash chamber, a steam outlet port and a brine outlet port, wherein the inlet port is connected to second flow control valve and to the thermal energy storage tank, the steam outlet port is connected to the condenser and the brine outlet port is connected to a brine collection tank.

17. The method of claim 1, wherein
an absorber plate is connected to the feed water heater, and
a solar energy concentrator is configured to direct sunlight towards the absorber plate during the first mode.

18. The method of claim 9, wherein
a brine collection tank is located beneath the flash chamber, wherein the brine collection tank is configured to store a brine water by-product released by the pre-heated contaminant-free feed water during conversion to steam.

* * * * *